United States Patent
Chava et al.

(10) Patent No.: US 7,154,901 B2
(45) Date of Patent: Dec. 26, 2006

(54) INTERMEDIARY NETWORK SYSTEM AND METHOD FOR FACILITATING MESSAGE EXCHANGE BETWEEN WIRELESS NETWORKS

(75) Inventors: Venkatesh Chava, Herndon, VA (US); Christian Zimmern, Fairfax, VA (US); Robert Lovell, Leesburg, VA (US); Kirk Tsai, Potomac, MD (US)

(73) Assignee: Mobile 365, Inc., Chantilly, VA (US)

( * ) Notice: Subject to any disclaimer, the term of this patent is extended or adjusted under 35 U.S.C. 154(b) by 52 days.

(21) Appl. No.: 10/426,662

(22) Filed: May 1, 2003

(65) Prior Publication Data

US 2004/0156495 A1    Aug. 12, 2004

Related U.S. Application Data

(60) Provisional application No. 60/445,444, filed on Feb. 7, 2003.

(51) Int. Cl.
*H04L 12/28* (2006.01)

(52) U.S. Cl. ........................... 370/401; 370/400

(58) Field of Classification Search ............... 370/401, 370/310–350, 351, 352–356, 400, 422
See application file for complete search history.

(56) References Cited

U.S. PATENT DOCUMENTS

| | | | |
|---|---|---|---|
| 5,351,235 | A | 9/1994 | Lahtinen |
| 5,621,727 | A | 4/1997 | Vaudreuil |
| 5,768,509 | A | 6/1998 | Gunluk |
| 5,887,249 | A | 3/1999 | Schmid |
| 5,894,478 | A | 4/1999 | Barzegar et al. |
| 6,208,870 | B1 | 3/2001 | Lorello et al. |
| 6,230,009 | B1 | 5/2001 | Holmes et al. |
| 6,240,293 | B1 | 5/2001 | Koster |
| 6,327,267 | B1 | 12/2001 | Valentine et al. |
| 6,366,663 | B1 | 4/2002 | Bauer et al. |
| 6,421,437 | B1 | 7/2002 | Slutsman |
| 6,484,197 | B1 * | 11/2002 | Donohue .................... 709/206 |
| 6,535,746 | B1 | 3/2003 | Yu et al. |
| 6,560,226 | B1 | 5/2003 | Torrey et al. |
| 6,594,254 | B1 | 7/2003 | Kelly |
| 6,658,260 | B1 | 12/2003 | Knotts |
| 6,697,355 | B1 * | 2/2004 | Lim .......................... 370/352 |
| 6,738,630 | B1 | 5/2004 | Ashmore |
| 6,772,267 | B1 | 8/2004 | Thaler et al. |

(Continued)

FOREIGN PATENT DOCUMENTS

EP        0 777 394 A1    12/1995

(Continued)

*Primary Examiner*—Huy D. Vu
*Assistant Examiner*—Jason Mattis
(74) *Attorney, Agent, or Firm*—Paul, Hastings, Janofsky & Walker LLP

(57) ABSTRACT

Network System and Method for facilitating message exchange between mobile subscribers belonging to the same or different public land mobile networks, possibly incorporating different standards. Message exchange between two subscribers of the same or different networks may involve one or more lookups on subscription data, zero or more message transformations, one or more routing decisions including application of costing functions, and, storage and propagation of the message in one or more Core or Intermediary networks. The messages may be of type, among others, SMS (Short Message Service), MMS (Multimedia Message Service), or EMAIL.

19 Claims, 16 Drawing Sheets

U.S. PATENT DOCUMENTS

| | | | |
|---|---|---|---|
| 2001/0046856 A1* | 11/2001 | McCann | 455/423 |
| 2002/0015403 A1 | 2/2002 | McConnell et al. | |
| 2002/0029189 A1 | 3/2002 | Titus et al. | |
| 2002/0091754 A1* | 7/2002 | Jang et al. | 709/203 |
| 2002/0112014 A1 | 8/2002 | Bennett et al. | |
| 2002/0167909 A1 | 11/2002 | Balazinski et al. | |
| 2003/0083078 A1 | 5/2003 | Allison et al. | |
| 2003/0118027 A1 | 6/2003 | Lee et al. | |
| 2003/0140226 A1* | 7/2003 | Yamamoto et al. | 713/156 |
| 2003/0202521 A1 | 10/2003 | Havinis et al. | |
| 2004/0032856 A1 | 2/2004 | Sandstrom | |

FOREIGN PATENT DOCUMENTS

| | | |
|---|---|---|
| EP | 0 959 600 A1 | 4/1999 |
| WO | WO 97/36434 | 3/1996 |
| WO | WO 99/11078 | 8/1998 |
| WO | WO 97/20442 | 11/1998 |
| WO | WO 99/33226 | 12/1998 |
| WO | WO 00/41533 | 1/2000 |
| WO | WO 02/25875 A1 | 9/2001 |

* cited by examiner

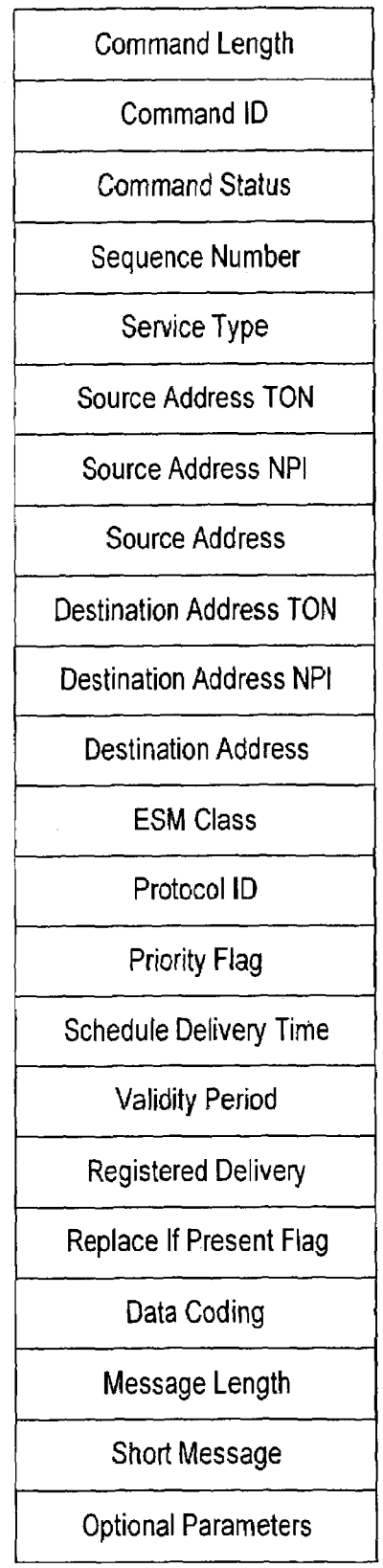
Fig. 5A SMPP 3.4 Message Format

SMT Message Format

| Message Type |
| --- |
| Destination TN |
| Origination TN |
| Message Content |
| Time Stamp |
| Markup Tags |

SML Message Format

| Message Type |
| --- |
| Destination TN |
| Origination TN |
| Message ID |
| Status Code |
| Markup Tags |

Fig. 6

```
                  2  ~[7.1]
[7.2]~
     +13017284941
     +17036082119 ~[7.3]
     NEXTE020827225432772 ~[7.4]
[7.5]~
     N
     in_agent=INAGN ~[7.6]
[7.7]~
     mc=3
     dp =SS7  ~[7.8]
[7.9]~
     dm=direct
     out_agent=SS7TX ~[7.10]
[7.11]~
     rsn=1105
```

Fig. 7

| Area Code | Exchange Code | Station Code |
|---|---|---|
| 3 Digits | 3 Digits | 4 Digits |
| NPA | NXX | XXXX |

Fig. 10

EXAMPLE OF GSM 7 Bit to ASCII TRANSLATION
(SAMPLE NUMBER OF ENTRIES SHOWN)

| Hex | Dec | Character name | Character | ASCII Code |
|---|---|---|---|---|
| 0x00 | 0 | COMMERCIAL AT | @ | 64 |
| 0x01 | 1 | POUND SIGN | £ | 156 |
| 0x02 | 2 | DOLLAR SIGN | $ | 36 |
| 0x03 | 3 | YEN SIGN | ¥ | 157 |
| 0x04 | 4 | LATIN SMALL LETTER E WITH GRAVE | è | 138 |
| 0x05 | 5 | LATIN SMALL LETTER E WITH ACUTE | é | 130 |
| 0x06 | 6 | LATIN SMALL LETTER U WITH GRAVE | ù | 151 |
| 0x07 | 7 | LATIN SMALL LETTER I WITH GRAVE | ì | 141 |
| 0x08 | 8 | LATIN SMALL LETTER O WITH GRAVE | ò | 149 |
| 0x09 | 9 | LATIN CAPITAL LETTER C WITH CEDILLA | Ç | 128 |
| 0x0A | 10 | LINE FEED | | 10 |
| 0x0B | 11 | LATIN CAPITAL LETTER O WITH STROKE | Ø | 237 |
| 0x0C | 12 | LATIN SMALL LETTER O WITH STROKE | ø | 248 |
| 0x0D | 13 | CARRIAGE RETURN | | 13 |
| 0x0E | 14 | LATIN CAPITAL LETTER A WITH RING ABOVE | Å | 143 |
| 0x0F | 15 | LATIN SMALL LETTER A WITH RING ABOVE | å | 134 |
| 0x10 | 16 | GREEK CAPITAL LETTER DELTA | Δ | |
| 0x11 | 17 | LOW LINE | _ | 95 |
| 0x12 | 18 | GREEK CAPITAL LETTER PHI | Φ | 232 |
| 0x13 | 19 | GREEK CAPITAL LETTER GAMMA | Γ | 226 |
| 0x14 | 20 | GREEK CAPITAL LETTER LAMBDA | Λ | |
| 0x15 | 21 | GREEK CAPITAL LETTER OMEGA | Ω | 234 |
| 0x16 | 22 | GREEK CAPITAL LETTER PI | Π | 227 |
| 0x17 | 23 | GREEK CAPITAL LETTER PSI | Ψ | |
| 0x18 | 24 | GREEK CAPITAL LETTER SIGMA | Σ | 228 |
| 0x19 | 25 | GREEK CAPITAL LETTER THETA | Θ | |
| 0x1A | 26 | GREEK CAPITAL LETTER XI | Ξ | |
| 0x1B | 27 | ESCAPE TO EXTENSION TABLE | | |

Fig. 15

INTERMEDIARY NETWORK SYSTEM AND METHOD FOR FACILITATING MESSAGE EXCHANGE BETWEEN WIRELESS NETWORKS

This application claims the benefit of U.S. Provisional Application No. 60/445,444, filed Feb. 7, 2003, which is herein incorporated by reference in its entirety.

FIELD OF THE INVENTION

The present invention is directed to the field of telecommunication and more particularly to an intermediary system that enables senders and recipients of messages to send and receive messages between wireless networks having incompatible network protocols.

BACKGROUND OF THE INVENTION

In North America, and many other parts of the world, mobile telecommunication networks are characterized by different standards such as TDMA, CDMA, GSM, iDEN and many variants thereof, such as 2G (Second Generation Networks) and 3G (Third Generation Networks). The standards typically specify the radio interface characteristics, equipment details and associated number schemes, applicable communication protocols including the associated message definitions and characteristics of inter-connecting networks. While some of the concepts are common among these disparate standards, the commonality of the concepts is not sufficient to make devices belonging to one network talk to devices belonging to another network for wireless messaging needs.

A telecommunication network supports many services. Primary among them are voice calls and messaging. Aspects of the present invention primarily concern messaging and, therefore, this description concentrates on expanding upon the state of messaging standards.

The wireless messaging revolution started primarily with the GSM standard with the introduction of Short Message Service (SMS). An SMS message can have a maximum of 160 characters (140 octets) and is used for a number of applications including person to person messaging, binary content such as ring tones, person to application messaging and a number of other uses. Almost all other standards such as ANSI TDMA and CDMA wireless networks also have implemented an equivalent form of short message support within their networks. A notable exception is iDEN, which implemented a packet data network and while messaging is supported, it does not have anything equivalent to short messaging.

There are other forms of messaging such as EMAIL, WAP and more recently Multimedia messages (MMS) supported by many of the networks. In some cases, one form of messaging is carried over the bearers of other forms of messaging. For example, an EMAIL message could be implemented with SMS as a bearer service.

In general, it is not easily possible to exchange messages across different networks supporting different wireless standards. SMS messaging has become very popular in Europe and other parts of the world due to implementation of the GSM standard in many networks, which makes it possible to exchange SMS messages easily across the networks. In the case of ANSI TIA/EIA 41 standards, such an exchange has not been possible until aspects of the present invention were put in place in North America in the year 2001.

The exchange of messages across different networks is further complicated by roaming, number portability, quality of service, "spam", and billing requirements. Due to its very nature, mobile networks permit roaming of subscriber units within the network and other networks implementing compatible standards, provided a business arrangement between the effected networks exists. In order to deliver a message to a mobile unit, it is necessary to find its current location and associated gateway and interface address.

One of the features of number portability is the ability to port a number from one service provider to another. Number portability poses problems with the delivery of messages when relatively static routing tables are used. A similar but independent problem arises out of "number range contamination". In North America, for example, messages and calls are routed to networks using what is known as NPA/NXX ranges. This methodology refers to routing of calls using the first 6 digits of the telephone number (TN) in the North American Number Plan (NANP). Traditionally, a set of number ranges segmented by NPA/NXX are assigned to service providers.

Recently, in United States, a change has been made in telephone number range assignments to service providers. Instead of the usual 6 digit number ranges, the assignments are made, now, using 7 digit ranges. However, during the reassignment, certain numbers in a range may be, what is termed as, "contaminated," where a small percentage of numbers may belong to one service provider, even though the range as a whole is owned by another service provider.

In addition to the contaminated and ported number issues mentioned above, there are a number of other inter-connectivity issues that may need to be addressed for flexible and reliable message bridging across different networks. For example, a source and destination network (with respect to a message going between subscribers of those two networks) may be inter-connected by more than one Intermediate network. The routing tables and associated methodologies must account for this multi-hop connection. A destination network may be accessible only through a designated service provider to the network. For example a SS7 service provider may have exclusive access to a carrier's network and the message must be routed through such a connection. There may be multiple types of connections to a network to reach the same mobile subscriber. Further, there may be multiple instances of a particular type of connection to a network to reach the same mobile subscribers.

In addition, there might be varying levels of Quality of Service for multiple connections to the same network.

To summarize, the following are many of the challenges that need to be addressed for successful and reliable exchanging messages between disparate wireless networks:

Protocol Conversion—ability to account for protocol differences

Transmission network support—ability to connect with the right kind of transmission network Inter-Domain or Inter-network Addressing Conversion—ability to perform address translation, as necessary Dynamic Routing Lookup—ability to resolve for accurate and timely routing information Message Transformation—ability to transform messages based on business and technical needs Storage and re-transmittal—ability to store and forward based on business and technical needs Recording of transmission events for billing and other uses—ability to record the message transmission events Management channel support—ability to manage message transmission Anti-spam, Authentication and other centralized value add services—ability to provide network protection.

Lateral transmission to other Intermediary networks—ability to interface with multiple networks Transaction support—ability to reliably transact a message delivery attempt Quality of Service—ability to support varying quality levels in providing service The network and system explained in this invention solves many of the above problems uniquely.

Interchanging signaling and messages between networks for peer to peer calls, messaging and roaming has been addressed in the prior art before by standards bodies, published papers and patents. Patent number WO 97/20442, for example, identifies a mechanism to exchange Short Message Service (SMS) between different networks by enabling the message center of a cellular network with the functionality of identifying target network, addressing mechanism and format. In particular, the patent describes a system that allows messages to be delivered to a conventional telephone network using facsimile message format transmission and wide or local area network using email message transmission. This system, however, specifically requires the sender of the message to identify destination network, protocol and the address of the recipient device within the network. Moreover it assumes that the message center of the cellular network is directly connected to the destination network by PSTN, LAN or WAN network, which is not necessarily the case in many practical networks.

Another system, described in DE 295 11 856 U1, provides a slightly alternate mechanism by way of use of a central switching device. A designated network specific device receives a message, stores the message, re-formats the message to suit an exchange format, and forwards the message to a central switching device. The central switch then routes the message to another device connected to the destination network. This system assumes a monolithic central switching device which could be a single failure point and doesn't offer much flexibility in dealing with many complexities (as are addressed here-in) of inter-connecting a plurality of networks. Moreover, a central monolithic switching device may become a performance bottleneck.

Another known technique proposes a plurality of intermediate switching architectures to overcome the above mentioned drawbacks.

WO 02/15603 A2 describes a centralized computer system or a computer program connected to a plurality of networks directly for delivering messages between networks and applications using a centralized routing database.

All the above systems and techniques take a relatively simplistic view of bridging messaging structures between various networks. They assume simplistic routing rules without considering many practical peculiarities of network interconnections. For example, in North America (and many countries) number pooling, contaminated ranges and portability make it difficult to correctly identify the destination carrier. Sometimes the messages coming from a network may have to be delivered back to the same network, after performing certain message transformations or route lookups. Due to wireless number portability, the numbers may be ported frequently, which makes it difficult to correctly resolve the destination network identity based on the address provided by originating subscriber. None of the patents cited above addresses these scenarios.

Also, the above patents do not address the issue of roaming subscribers. Nor do they address the possibility of a plurality of connections or links, possibly operating different protocols, to the same destination network and mechanisms to choose a particular connection in an optimized way. In addition, multiple protocol addresses assigned to the same subscriber unit is possible within the same network in the real world (such as an email address and phone number to the same mobile unit), which again does not find any mention in any of the above patents. Security, authentication, billing, error handling, reporting and many other value-add functions that are critically important for message delivery in the practical world are not mentioned in the above cited inventions.

In addition, the cited patents do not explicitly refer to delivery of messages using SS7 networks directly which is the preferred network protocol used by almost all the telecommunication networks for delivering messages. SS7 is the core network inter-connecting network elements of wireless networks currently.

Therefore, realization of any practically relevant message delivery system based on the above patents falls short of a reliable message delivery mechanism between networks because of the cited reasons.

WO 02/05580 A1, however, clearly addresses delivery of SMS messages between PLMNs (Public Land Mobile Network) using the traditional SS7 network approach involving Switching Centers, Message Service Centers, Home Location Registers and the like. However, the described system strictly deals with bridging two different SS7 networks through an inter-working message center and does not address other forms of interconnection such as IP networks. In addition, this invention deals with end to end message transmission using MAP signaling messages, wherein, particular message sequences are translated into the format of destination network. The approach proposed by this system works only for SMS messages and doesn't perform any kind of message transformations. For example, if the destination network doesn't open up the SS7 network for Intermediary for message delivery, the system fails to provide a solution.

SUMMARY OF EMBODIMENTS OF THE INVENTION

The present invention relates to interconnecting mobile networks that are complex and support multiple standards and business rules. Aspects of the present invention enable messages to be exchanged between two mobile units through application of many different functionalities including message transformations, accurate and optimal route lookups incorporating application of number portability and contaminated ranges, application of protocols, costing functions and business rules.

More specifically, the present invention relates to a method of facilitating routing of a message from one mobile network to another network that are interconnected by a service network and associated software control mechanisms. The message could be one of many formats including, but not limited to, a short message, email, and multimedia message. In accordance with aspects of the present invention, a message originated from a mobile unit may be passed through several gateways within the originating mobile network for further transmission. These gateways include, among others, Short Message Service Centers (SMSCs), Multimedia Message Centers (MMSCs), WAP Gateways, Email Gateways, and Interworking Mobile Switching Centers (IWMSCs). It is possible for a single message to traverse more than one of these gateway units.

In an embodiment of the present invention, an independent service network and system (hereinafter called "Intermediary network," or simply "Intermediary") receives the message from any one of the above mentioned gateways belonging to the originating mobile network, for the purpose of delivering the message to the destination. The Intermediary has a set of Input Units, a set of Output Units (these two Units, together called "Interfacing Units"), a set of Transformation Units, and a set of Routing Units (these last two Units, together, called "Internal Units"), each, in a preferred embodiment, with a well-defined functionality and purpose. These units are wired according to the characteristics of connected mobile networks and associated business unit requirements.

In accordance with the present invention, the message received through one of the Input Units passes through one or more Transformation Units and Routing Units according to several pre-determined business rules as well as dynamically determined routing rules based on the prevailing conditions of the inter-connecting networks.

Subscription information denotes the association of subscriber's phone number to a network service provider. Current access association provides the address of visited network (mobility). According to one aspect of the invention, the dynamic routing ability of the Intermediary network, takes into account the latest network subscription association information of the terminating device, current network access association of the terminating device and the traffic conditions of a plurality of links connecting to the terminating mobile network. This significantly increases the likelihood that the message will be successfully delivered.

According to one embodiment of the invention, dynamically changing routing information is obtained by subscription to one or more $3^{rd}$ party information sources (such as NPAC data), accessing one or more information repositories (such as a Home Location Register—HLR) in real time, and/or monitoring the traffic conditions on inter-connecting links to the mobile networks. The dynamic information thus obtained preferably changes the way the message might have otherwise been routed. In addition, according to an aspect of the invention, the dynamic information may also specify which of the transformations needs to be applied in order to successfully route the message. For example, if the message is dynamically routed to another Intermediary network instead of a final destination directly, then the formatting of the message may correspond to that of an Intermediary Network rather than the final destination network.

According to another embodiment of the present invention, the content of the message may also influence the transformation units applied to the message. For example, if the original content is in the English language and if the intended destination unit resides in a network whose predominant language, according to the network's primary geographic boundary is, e.g., Chinese, then the content may be translated, depending upon configured business rules, to the Chinese language before forwarding to the destination network.

The present invention preferably also includes mechanisms to specify which set of transformation and routing units need to be applied to a given message based on the link or Interface Unit the message came through. For example, a message that came through an indirect link such as an EMAIL gateway may not generate a billable record (depending on agreed-upon business arrangements) to the originating mobile network.

The message, according to one embodiment of the invention, thus preferably passes through a dynamic set of Routing and Transformation Units based on one or more of: the content of the original message, the interface through which the message came-in, the business rules of the mobile networks involved, and the dynamic nature of the interconnected links, network subscription and access information of the destination mobile unit.

Thus, the present invention provides systems and methods that permit flexibility and optimization with respect to receiving and delivering messages by an Intermediary that spans disparate networks. Those skilled in the art will more fully appreciate the features and advantages of the present invention upon a reading of the following detailed description of the preferred embodiments of the invention in conjunction with the associated drawings.

BRIEF DESCRIPTION OF THE DRAWINGS

FIG. 5A shows an SMPP message format.

FIG. 6 shows the format of SMT and SML messages used internally in an embodiment of the present invention.

FIG. 7 shows a particular instantiation of an SML file.

FIG. 10 illustrates the number format of the North American Number Plan (NANP).

FIG. 15 shows an example character translation between GSM and ASCII character sets.

DETAILED DESCRIPTION OF THE SEVERAL EMBODIMENTS

Figure 1:
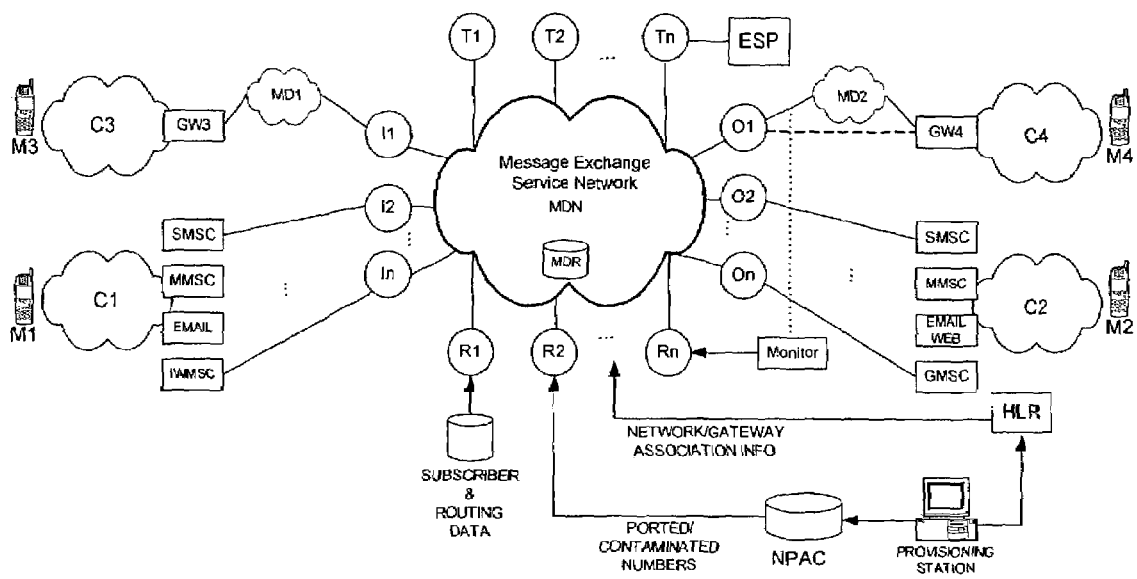
FIG. 1 is a diagram representing an exemplary implementation of an embodiment of the present invention.

FIG. 1 presents a diagram representing one exemplary Implementation of a system in accordance with the invention. The invention provides a flexible Intermediary network system that interconnects multiple wireless networks, directly or indirectly, through other service providers, for the purpose of message exchange. Such a system is comprised of a set of input units (I1 thru In); a set of output units (O1 thru On)—both called I/O transformation units or simply transformation units; a set of internal transformation units (T1 thru Tn) and a set of routing units (R1 thru Rn). It is noted that the set of transformation and routing units represented in the figure are not exhaustive but a representative sample. The routing units R1 thru Rn are also shown to be further connected to Subscriber & Routing Database, NPAC database that contains ported telephone number information, a Home Location Register (HLR) that contains subscriber and routing information in carrier's SS7 network, and a Monitor unit that monitors the health of various links in real time.

The I/O transformation units are directly connected to the external networks. These external networks are either wireless networks or other Intermediary networks or service providers. The purpose of these I/O transformation units is to match the protocol of interconnected networks to facilitate accepting or sending a message from, or to, these networks respectively. FIG. 1 shows, as an example, four wireless carrier networks, denoted C1 thru C4, that are interconnected by the Intermediary network (MDN). A set of mobile phones, M1 thru M4 associated with carrier networks C1 thru C4, respectively, are also shown in FIG. 1. FIG. 1 further shows another set of Intermediary networks, MD1 and MD2 connecting carrier networks C3 and C4 to the Intermediary network MDN. In addition, FIG. 1 shows various gateways, denoted as SMSC, MMSC, EMAIL, IWMSC and GMSC that are part of carrier networks. These gateways are further connected to various input and output transformation units of Intermediary network (MDN). An external service provider (ESP), is also shown to have been connected to one of the transformation units, Tn, in the Intermediary network. For certain specialized (e.g., language translation) or outsourced message transformations, an external service provider may be used by the Intermediary network operator and the present invention envisages such a functionality as a transformation occurring external to the Intermediary network.

The internal transformation units perform a variety of transformation functions on the messages as they traverse through the Intermediary network. The complexity of interconnecting disparate wireless networks through an Intermediary warrants a rich set of transformation units which are applied to the message.

The routing units provide a flexible way to interconnect all (or substantially all) other units in the system based on certain rule sets provisioned in the routing units. The routing units also resolve the destination routing for the message received based on the address information presented in the message and based on dynamic routing tables available within the system.

The above described embodiment of the present invention, as denoted in FIG. 1, shows a particular example of interconnection of multiple carrier networks through various representative sets of gateways, for the purpose of exchanging messages such as SMS, MMS and Email (SMTP formatted messages). Finally, MDR denotes message detail record database located in Intermediary network (MDN) that captures the transaction information of all the messages flowing through the network.

Intermediary Network Description

The conceptual diagram in FIG. 1 can be implemented in a number of ways realizing all the functionality mentioned in this embodiment. By breaking out the functionality of this invention it is possible to describe possible embodiments of network and system realization of this Invention.

The present invention primarily describes the functionality of interconnecting various carrier and service provider networks to the Intermediary network. The Intermediary network can consist of one of more POPs (Point of Presence) for network connectivity and one or more data centers for staging message switching equipment. A practical realization comprises a distributed network with multiple data centers and POPs interconnected by an IP backbone. The service provider networks (carrier networks) are typically connected to one or more of the POPs using Wide Area Network connections such as T1, Frame Relay, and Internet VPN.

These network connections typically terminate on network end points connected to routers. In addition, a well formed network infrastructure consist of firewalls for security purposes, load balancers, switches for interconnecting network segments and various other ancillary devices such as Intrusion Detection Systems, Network Analyzers etc. Also, Domain Name Servers (DNS) infrastructure for resolving domain names into IP address and vice-versa are also typically realized as part of the network equipment.

Since the invention details the Intermediary network as a distributed message switch, the system preferably comprises of one or more (typically several for scalability and redundancy) message switching systems implementing the transformation and routing modules indicated in FIG. 1. These systems can be implemented using industry standard servers. Further, these message switching systems are interconnected by a messaging bus to transfer SMT (FIG. 6) and SML (FIG. 6) formatted messages as well as various other management type messages. For SMS messaging, the core switching systems typically consist of Short Message Service Center (SMSC) functionality. For MMS messaging, the core switching systems typically consist of Multi-media Messaging Service Center (MMS) functionality. In addition, email messaging systems are supported by traditional email servers and relays.

Various industry standard protocols are supported by the above mentioned gateways. These include, for SMS: Short Message Peer to Peer protocol (SMPP), EMI/UCP, SMTP, HTTP, CIMD, GSM/ANSI 41 MAP and the like. The switching systems mentioned in the previous paragraph support these protocol units on as needed basis depending upon carrier requirements. Various backend database servers for logging and billing functionality are also typically implemented in an embodiment.

Another important class of systems preferably associated with the present invention is Wireless Number Portability and Routing databases. These systems are realized using database systems with data feeds coming from various sources such as NANP LERG data providers, real time NPAC database feeds and carrier routing table updates.

Various network and systems management functionality is preferably provided to manage all the elements mentioned above. One or more network operations center (NOCs) implementing Network and Systems management interfaces preferably oversee the operation of the Intermediary network.

Finally, File Transfer Protocol (FTP) servers are typically part of an embodiment of this invention to transfer Call Detail Records (CDRs) to service providers.

Thus, the Intermediary network is an inter-connected network system supporting routing, switching and security functionality realized to support cross-network messaging functionality.

Inter PLMN Message Transfer in GSM Networks

Figure 2:
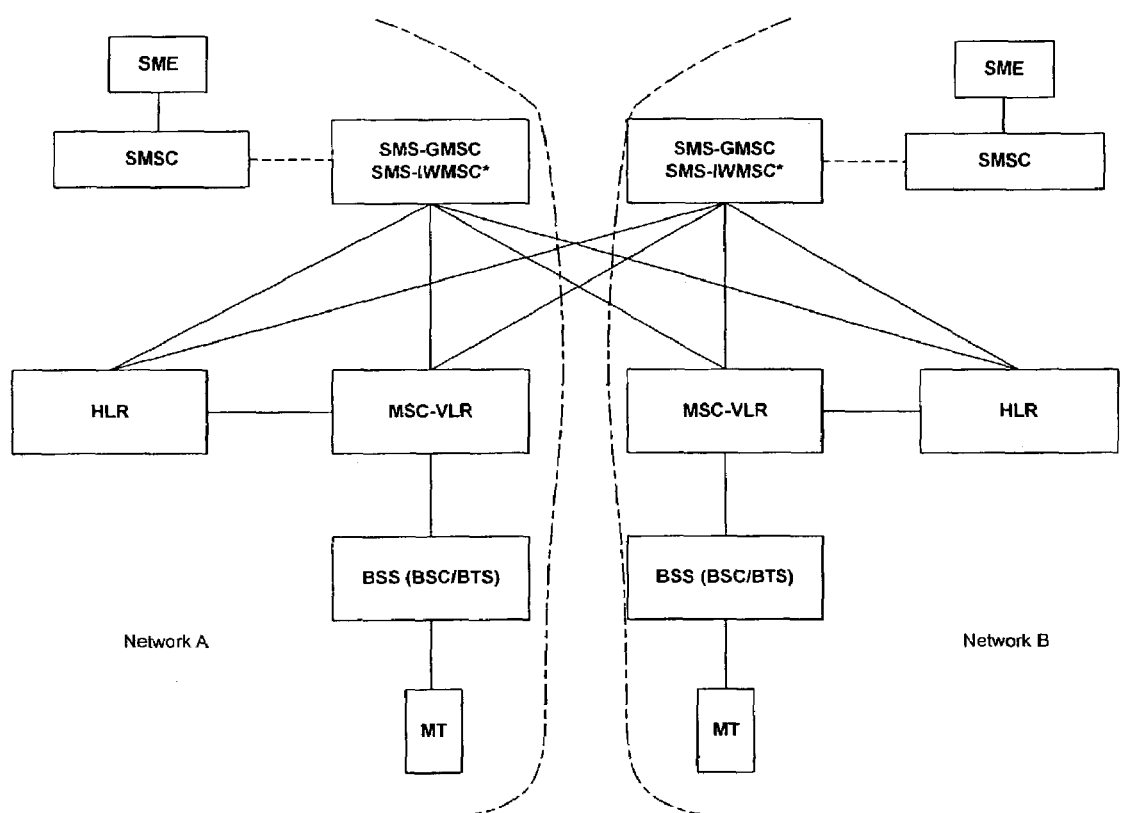
FIG. 2 illustrates prior-art that is used for exchanging SMS messages between Public Land Mobile Networks (PLMNs) implementing compatible protocols.

FIG. 2 shows a standard mechanism in GSM networks for exchanging SMS messages. This prior art is given as an example of prevailing mechanism for interchanging messages in many of the networks implementing GSM protocols.

In FIG. 2, MT represents a mobile terminal that is used to access the radio network. Base Station Subsystem (BSS) is connected to Mobile Switching Center (MSC) which is in-turn connected to a Visitor Location Register (VLR). The purpose of the BSS system is to manage the radio resources and communicate with the MSC. The purpose of the MSC is to switch and direct calls from the PSTN and other networks to the mobile subscribers that are associated within its serving area. The purpose of the VLR is to provide subscriber information of the mobile terminals that are currently "visiting" the network (i.e., that are getting services from the network). GMSC and IWMSC represent gateway MSC and Inter-working MSC whose purpose is to route messages in and out of SS7 network into other networks. Short Message Switching Center (SMSC) represents a server that processes SMS messages. Home location Register, HLR holds the subscriber information. SME represents short message entity that posts SMS messages into an SMSC.

When a message is originated from a mobile terminal MT in Network A, the message (called Mobile Originated Message or MO message) is received by the home SMSC in Network A. The SMSC in Network A performs a route lookup function which typically accesses a HLR located in the network of intended receiver of the message. In this example, a HLR located in another PLMN, Network B. The HLR in Network B returns the address of the MSC in network B, that is currently serving the mobile subscriber (intended recipient). The SMSC in Network A then sends the message to the MSC in network B, for forward transmission of message to the Mobile subscriber MT in Network B.

For the above mentioned mechanism to work, in case of SMS message exchange, both the PLMNs (represented by Network A and Network B) must be compatible and there must be a business relationship between the PLMN operators to exchange such messages.

For messages to be exchanged between other types of networks such as CDMA, TDMA, iDEN etc. an Intermediary network mechanism in accordance with the present invention is provided as shown in FIG. 1. A more detailed diagram of how the set of transformation and routing units might be connected to process and route wireless messages is shown in FIG. 3.

Message Routing Through Intermediary Network System

Figure 3:
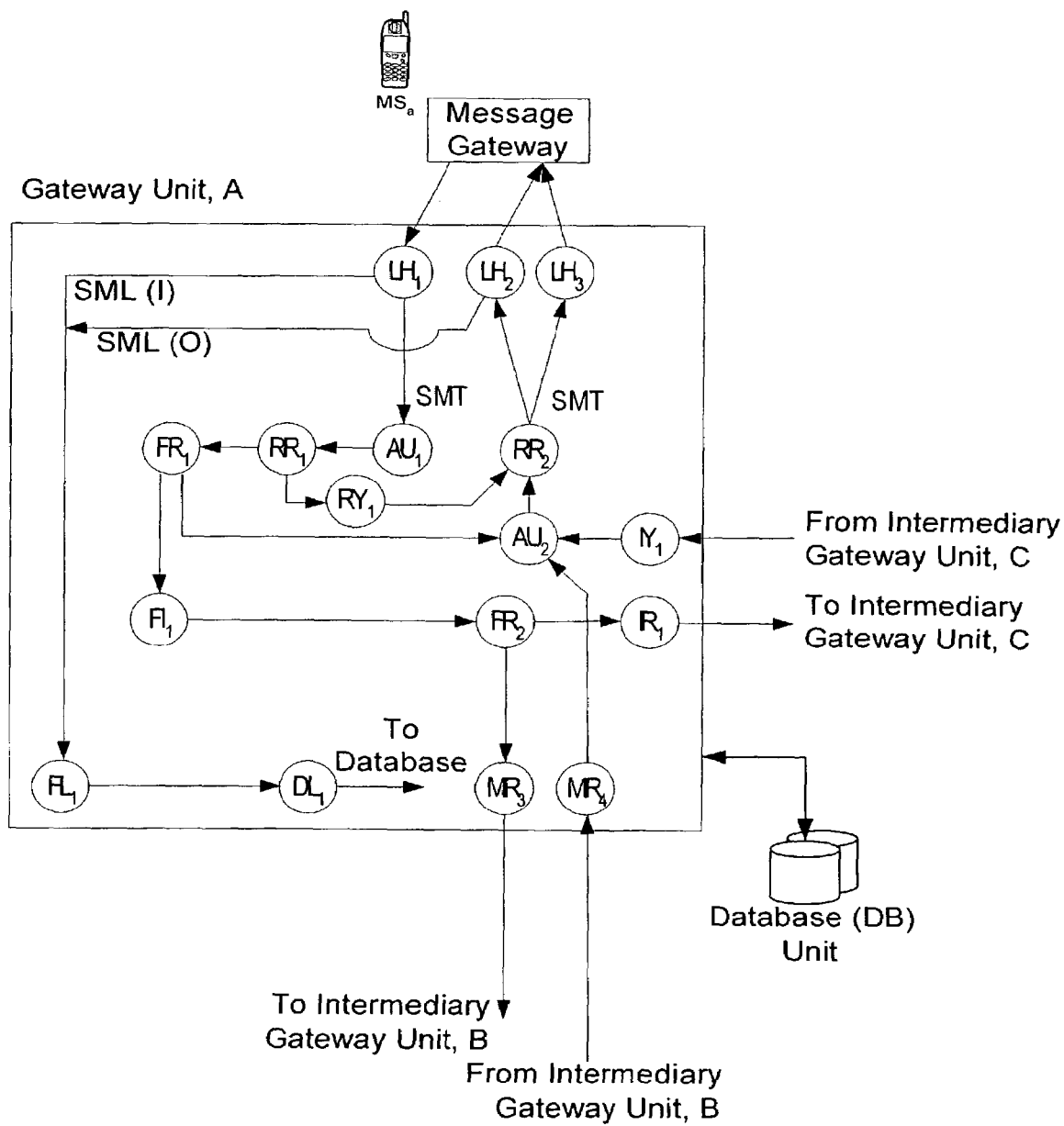
FIG. 3 shows an implementation for routing and transformation units inside a Gateway Unit, in accordance with a particular embodiment of the present invention.

FIG. 3 illustrates a particular implementation of the set of interface units and internal units for a carrier connected directly to the Intermediary in accordance with the present invention. The carrier's Message Gateway, which for the purpose of this example is an SMSC, is connected using three (3) links to three (3) line handlers $LH_1$, $LH_2$, and $LH_3$. These line handlers are specific examples of a particular implementation of Interface Units (I1 thru In and O1 thru On) that perform protocol conversion as specified in FIG. 1. Specifically, $LH_1$ functions as an Input Unit for receiving messages and $LH_2$ and $LH_3$ function as Output Units for sending messages to SMSC (Message Gateway in FIG. 3).

In addition to functioning as Interface Units for sending and receiving messages, $LH_1$, $LH_2$, and $LH_3$ in FIG. 3 also has embedded message transformation functionality. $LH_1$ transforms the incoming Short Message Peer to Peer (SMPP) protocol format messages shown in FIG. 5A into an internal System Formatted Message Template (SMT) format message shown in FIG. 6. Similarly, $LH_2$ and $LH_3$ transform outgoing SMS message in SMT format shown in FIG. 6 into SMS messages in SMPP format shown in FIG. 5A. One common message transformation handled within the line handler units is character mapping from one standard to another. For example, FIG. 15 shows character mapping between GSM 7 bit and ASCII character sets. Only partial mapping is shown in FIG. 15 as an example.

After $LH_1$ in FIG. 3 receives and transforms the message into SMT format, the message is sent to an Authenticator Unit-1, ($AU_1$). The functionality of this unit is to either route, forward or block a message after authorization of the message originator. In this particular implementation, the authorization involves checking if the originating mobile subscriber unit's telephone number is authorized for using the Intermediary services. The authorization process involves accessing a database (DB), for subscriber information. One function of this initial checking is to enforce an anti-spam policy. If a subscriber is known to send excessive number of messages for the purpose of spamming other users of mobile networks, then the person may be blocked from sending messages using this mechanism.

The message forwarded from $AU_1$ unit in FIG. 3 is processed by another routing and transformation entity called Regular Expression Router-1 ($RR_1$). The purpose of $RR_1$, as configured in this particular implementation, is to check the validity of the destination telephone number. For example, if the destination telephone number format required is 10 digit, and if the supplied destination telephone number is 7 digits, then this units extracts the source telephone area code number, NPA in FIG. 10, and appends the area code appropriately to the destination telephone number (TN) portion of the SMT formatted (FIG. 6) message.

If there is an error in performing above transformation (which can happen for example in case of overlay area codes in a particular geographic area, where two or more area codes are active simultaneously), then the message is forwarded to another transformation and routing entity Message Router-1 ($RY_1$ in FIG. 3), which generates an error message back to the source telephone number informing the originating subscriber that the message failed due to a problem with the area code. This error message is then forwarded to another routing entity called Regular Expression Router-2 ($RR_2$ in FIG. 3), which checks the validity format of the message. $RR_2$ (in FIG. 3) then forwards the error message to one of the output units $LH_2$ or $LH_3$ (both in FIG. 3) for transmitting the error message back to the originating network's Message Gateway. $RR_2$ (in FIG. 3) employs more routing functionality which is described later herein.

Figure 5:
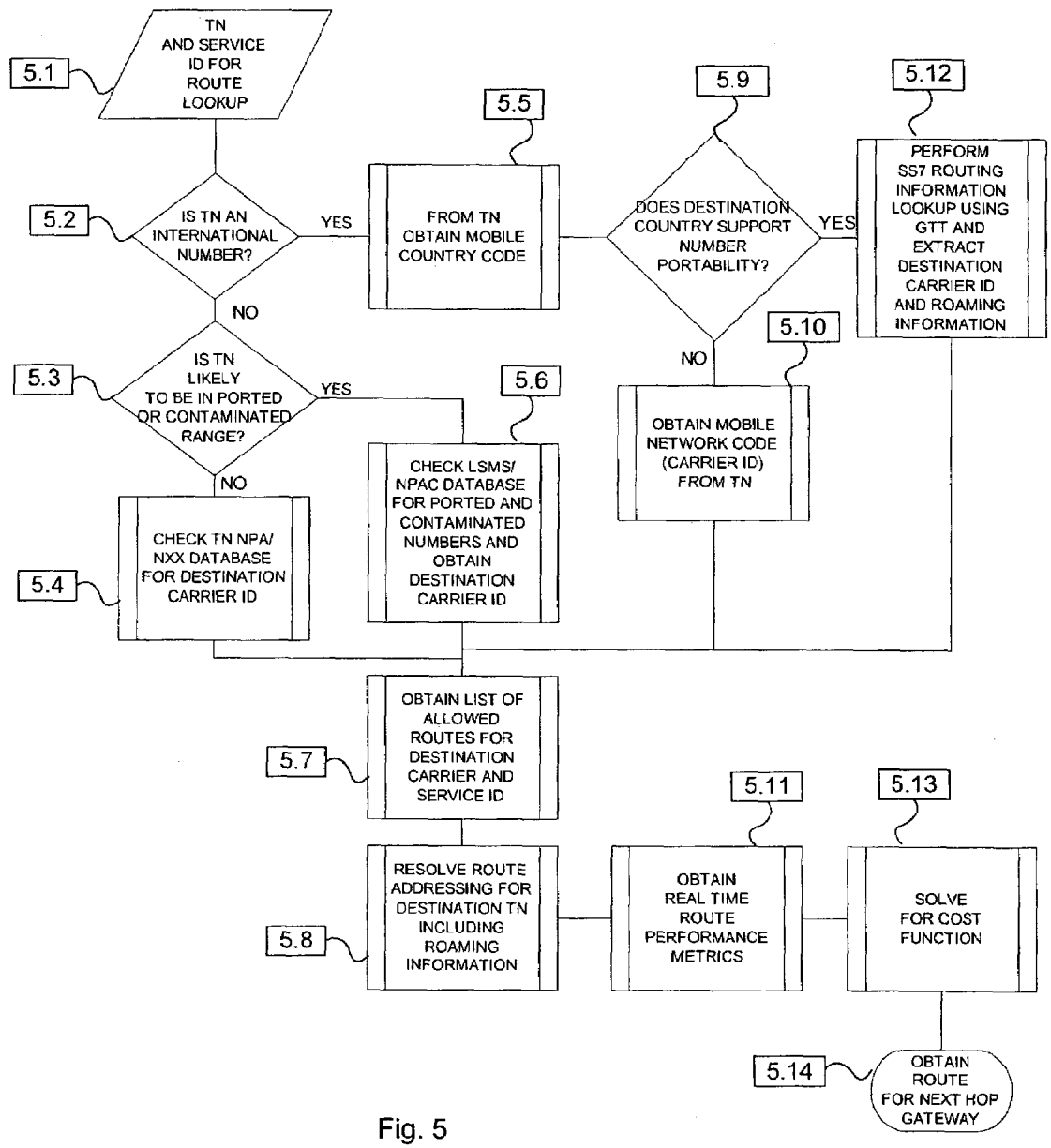
FIG. 5 shows exemplary routing logic and resolution of a cost function for selecting the next hop route for a message, in accordance with the present invention

Valid messages forwarded from $RR_1$ (of Gateway Unit A) are further processed by a set of routing entities called File Router-1 ($FR_1$) and File Router-2 ($FR_2$), in FIG. 3. Together, these entities resolve the delivery method for the message including solving some or all of a cost function depending upon the configuration provisioned. The logic for resolving the destination routing address is shown in FIG. 5 and is explained under the Routing Resolution Logic section later herein. Entity $FI_1$ in Gateway A denotes a filter transform which blocks binary messages, should a carrier (or the Intermediary) decides not to accept binary message transfer through Intermediary.

Depending upon the outcome of the routing resolution logic, the message is either forwarded to another gateway unit, C, via a routing unit InphoRouter-1 ($IR_1$), or to a gateway Unit, B, via a routing unit Message Router-3 ($MR_3$) as shown in FIG. 3. For the purpose of this illustration, further processing of the message in gateway unit B is covered in FIG. 4. Gateway Unit C, in this embodiment is connected to a Carrier C (not shown).

Figure 4:
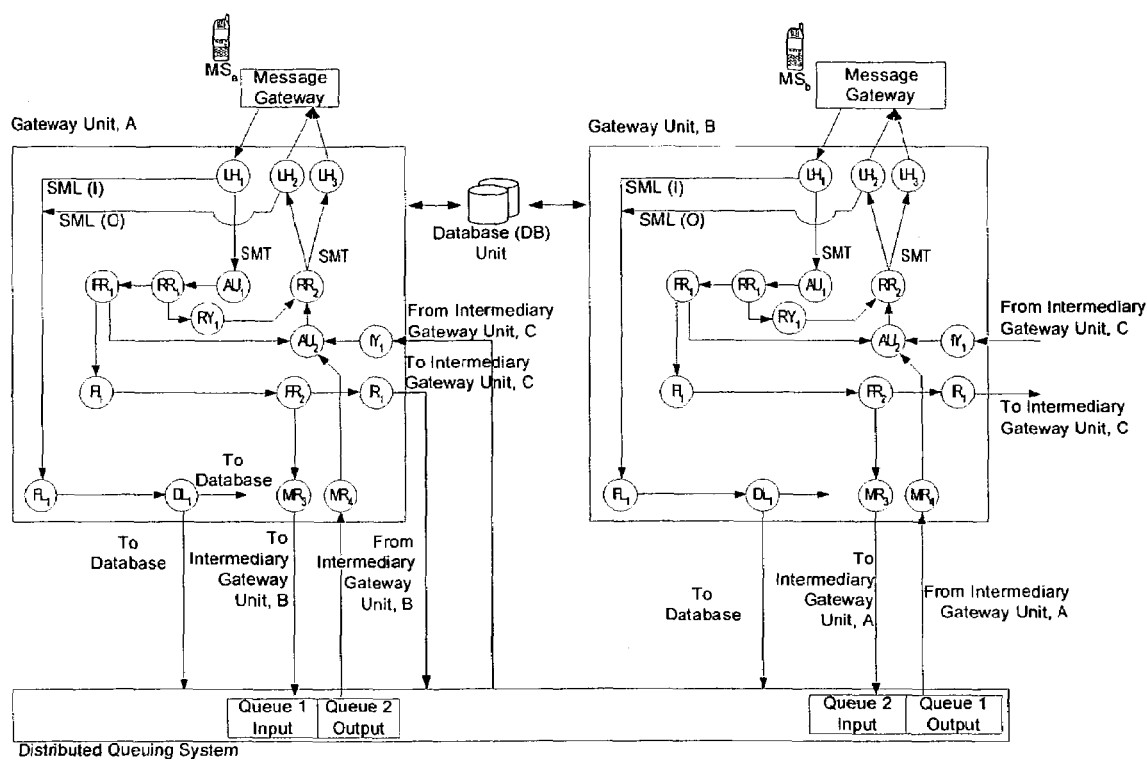
FIG. 4 shows inter-connection between two Gateway Units connected to two different wireless networks, in accordance with the present invention.

FIG. 4 shows the interconnection of Gateway Unit, B and Gateway Unit, A, connected by a distributed queuing system. The message forwarded from $MR_3$ of Gateway Unit A, flows through a queue "Queue 1 Input" which is extracted by a Message Router unit ($MR_4$) in gateway unit B. MR4 then performs basic validation of the message before forwarding the message to Authentication unit $AU_2$ of Gateway Unit, B. $AU_2$ authenticates the message to make sure that the message is authorized to go to Carrier B connected to gateway Unit B. The authentication here involves checking, e.g., if Carrier A is authorized to post a message to Carrier, B; if the originating subscriber is authorized to send messages into Carrier B's network via its messaging gateway; and if the destination subscriber is allowed to receive messages. The authentication information is stored in a provisioning database, shown in FIG. 4 as Database (DB) Unit. The message is then forwarded to another routing entity called Regular Expression Router-2 ($RR_2$ of Gateway B) whose functionality is to apply load balancing functionality and forward the message to one of the inter-connected line handlers ($LH_2$ or $LH_3$ of Gateway Unit B). Finally, Line handlers ($LH_2$ or $LH_3$ of Gateway Unit B) forwards the message after appropriate protocol conversion to Mobile Subscriber $MS_b$ via Message Gateway connected to Gateway Unit, B.

Thus, in the above embodiment a message from subscriber denoted by $MS_a$ to subscriber denoted by $MS_b$ took the route of: Gateway A: $MS_a \rightarrow LH_1 \rightarrow AU_1 \rightarrow RR_1 \rightarrow FR_1 \rightarrow FI_1 \rightarrow FR_2 \rightarrow MR_3 \rightarrow$ Queue 1 $\rightarrow$ Gateway B: $MR_4 \rightarrow AU_2 \rightarrow RR_2 \rightarrow LH_2 \rightarrow MS_b$ In the process, the message underwent a number of routing decisions and transformations.

Routing Resolution Logic

The destination Telephone Number (TN) and the service encoded in the SMT formatted message shown in FIG. 6, are sent through a series of logic modules shown in FIG. 5. In FIG. 5, the TN is examined in module 5.2 to see if it is a national or international number. Module 5.3 examines the national TN to see if a 6 digit NPA/NXX routing check is sufficient to find the destination carrier's network or a full 10 digit contaminated or ported number check needs to be performed. Modules 5.4 and 5.6 perform database checks to find the carrier ID based on the supplied TN. Specifically, module 5.6 involves route lookup using Local Service Management System (LSMS) database whose data is preferably updated continually on a real-time basis. The feed for this data is preferably obtained from a $3^{rd}$ party service provider that maintains a master provisioning database accessed by all carriers in USA. This continuous feed provides real-time information about the subscription association of the subscriber in providing the carrier network ID. In addition, the feed preferably also contain information about certain message gateways such as Short Message Service Center (SMSC).

For an International Number, first a country code is extracted in module 5.5. If the country has implemented number portability then one of two methods is preferably used to find the destination carrier. In one method, a local ported database is used (similar to the one used for national ported number lookup). This ported database is built from information supplied by the carriers and $3^{rd}$ party providers. Another method is to perform a remote database lookup. One such method is to use an SS7 Global Title Translation database in which a route request message is routed to the right Home Location Register (HLR). The HLR then responds with appropriate routing information which can be used to extract home carrier network as well as roaming information. The SS7 method is mentioned in module 5.12 in FIG. 5.

Once the carrier for the destination TN is identified, then all possible routes (direct and indirect) to the carrier's network for the service type are obtained in module 5.7. These routes are typically static in nature and determined during the provisioning process for the carrier.

Once routes are identified, then final address resolution may be attempted in module 5.8. A further address resolution in Module 5.8 may be needed for a number of reasons. For example, if a direct delivery (i.e., no store and forward) of a SMS message is allowed through say a MSC to the handset, then it is important to know (if not already obtained in module 5.12 logic) the visited MSC gateway information which is dynamically updated by the concerned Home Location Register (HLR) in the carrier's home network.

If more than one route is possible then module 5.11 may be invoked to obtain the current state of each of the links to the mobile subscriber. These links may be direct links or indirect links through another service provider. A cost function in module 5.13 may be invoked to find the best route to deliver the message based on certain pre-defined business rules. The cost function is explained in the next section.

During the route resolution process, once a destination carrier is identified, one or more filter modules may be invoked. For example, in FIG. 3, module named $FI_1$ acts as a transformation unit in which all binary messages are blocked from going further. This may be due to the preference of destination carrier specified to the Intermediary.

Once final route resolution is thus performed using both static and dynamic data, the SMT formatted message is then forwarded to either IR1 or MR3 routing modules in FIG. 3. These modules would then forward the message to appropriate gateways within the Intermediary network for further processing and delivery.

Referring again to FIG. 3, the module $LH_1$ (and other similar modules) preferably applies another transformation to the incoming or outgoing message by generating a new message for the purpose of recording the event of message crossing the boundary of the system. The new message is generated, in what is known as, a SML format shown in FIG. 6. This new message is again passed through some routing and transformation modules before recording the event in a database. For example, $FL_1$ in FIG. 3 is a transformation module that archives the SML formatted message in a persistent file format for debug and error recovery. $DL_1$ in FIG. 3 is another transformation entity that converts the SML formatted message into a database record which could be used for many reasons including, for example, generation of CDRs (Call Detail Records), which many telecom carriers used for feeding into their billing systems.

FIG. 4 shows extended version of FIG. 3 for the purpose of detailing outgoing SMT formatted messages. FIG. 4 shows two units, denoted by Intermediary Gateway Unit A and Intermediary Gateway Unit B, which are connected to Carrier A and Carrier B networks respectively. These gateway units could be implemented as commercially available servers or a virtual process inside a larger computing unit. One of the advantages of implementing multiple physical units is for the purpose of scalability and fault-tolerance. When one processor fails, for example, another processor could take over the role of the failed one. The gateways are interconnected by another set of routing entity called Distributed Queuing System (FIG. 4). The role of this unit is to route the internal system messages from one gateway unit to another and implement queuing functionality during the transit.

Cost Function

The following describes how a message is delivered to the next hop or final destination network based on business rules and dynamic conditions of the network and routing information. Several cost functions for determining an optimal route is available in the literature. Closed loop cost functions are typically possible if the routing is based solely on the state of the network. If business rules and other manual specifications are to be included, then the cost function is typically rule based (heuristic or otherwise).

For the purpose of this invention, the cost function is rule based and the evaluation of the cost function is embedded in one or more Routing Units.

A sample of a rule based cost function incorporating business rules for final delivery of message is shown below:
 1. If message can be delivered directly to the destination carrier via one of direct links then the same may be used.
 2. If a direct link exists to a visited network in case of roaming mobile subscriber then this link may be used over other direct links to home network.
 3. In case of more than one direct link, select the link that offers the best quality of service.
 4. If more than one direct link supporting same protocol with same quality of service metric exists then perform load balancing using round robin algorithm.
 5. If no direct link exists, then use indirect links and apply similar criteria (steps 1 thru 4) as the direct links mentioned above.
 6. In case of congestion in one or the direct or indirect links, drop the link from the pool till the congestion condition is alleviated.
 7. In case of no active link, store the message for a maximum of 72 hours and attempt delivery using a exponential back off algorithm using a seed value of 5 minutes, with the delay doubling every retry.

The cost function may be different for each destination carrier based on the business agreements reached. For example, a MMS message to a particular carrier is always pushed through a WAP proxy gateway even though the same message may be able to be posted to carrier's MMS Relay gateway. Such a rule might be requested by a carrier to reduce load on its MMS Relay gateway.

Load Balanced Routing

The Intermediary network may have multiple links to the destination carrier or next hop network. Load balancing is attempted when more than one link offering the same Quality of Service is available to the same destination. For example, for SMS messaging, if more than one SMPP (Short Message Peer to Peer) link is available to an SMSC then the SMPP links become a load balanced pool and one of the following methods (Round Robin routing or Random routing) is attempted.

$L_n$ denotes the link number selected for sending the nth message $N$ denotes the total number of healthy links available to the same Access Point.

Round Robin Routing:

$$L_n = (L_{n-1} + 1) \bmod N,$$

Random Routing:

$$L_n = Rand(N)$$

When a link is highly congested or otherwise not available for handling traffic, the link can be pegged as non-active and removed from the pool of available links until the link becomes healthy again. The health check is typically performed periodically and the message routing is affected in real time.

Routing Database

In order to accurately and timely route a message from a source network to destination network, the Intermediary must possess a complete, accurate and up to date routing database. Typically, in a telecom environment, routing is done using a Telephone Number (TN) which is specified in several formats. Each country may have its own numbering plan and there are certain standard representations of numbering schemes at the international level to make sure that network interoperate for subscribers to dial each other.

In North America, many countries follow what is known as the North American Numbering Plan (NANP). The rules of the NANP specify that a telephone number will contain ten digits and that those digits may be divided into three separate components (in the following, the numbers with dotted representation refers to the number range allowed for a particular digit in a numbering plan):
 1) Area Code. The first three digits of a telephone number comprise the Numbering Plan Area (NPA) or area code. The format of this component is (2 . . . 9)(0 . . . 9)(0 . . . 9) which provides for a total of 800 possible combinations or values—200, 201, . . . 999.
 2) Exchange Code. The next three digits of a telephone number identify a specific Central Office (CO) or exchange within the indicated area code. This component is commonly referred to as the NXX portion of the telephone number. The format of this component is (2 . . . 9)(0 . . . 9)(0 . . . 9) which provides for a total of 800 possible combinations or values—200, 201, . . . 999.
 3) Station Code. The last four digits of a telephone number identify a specific station within the indicated central office. The format of this component is (0 . . . 9)(0 . . . 9)(0 . . . 9) (0 . . . 9) which provides for a total of 10000 possible combinations or values—0000, 0001, . . . 9999.

In North America, the number ranges are issued to carriers typically at the NPA/NXX level which means each block contains about 10000 numbers. This means it is only necessary to examine the first 6 digits of a Telephone Number in order to find the carrier that owns the number block. In order to route a message from one telecom network to another, if a gateway to a network is used instead of direct delivery to the subscriber using a switch, it is only necessary to find the carrier of the network. Further routing of message to the actual subscriber is taken care by the gateway. For example, a message to a carrier's subscriber may be delivered to its email gateway. The email gateway would then route the message internally.

However, due to a mandate by the Federal Communications Commission (FCC), wireless number portability (WNP), which allows a subscriber to port his/her number while changing service providers, is permitted. While full WNP is not yet implemented, a related concept called number pooling is in effect. The number pooling mandates all the carriers to return certain unused portions of their allotted number ranges in the NPA/NXXX range. However, the unused portions might still contain a few numbers used by a carrier before the carrier returned the pooled range back to the administrative pool for redistribution. Such a pool where a small number of Telephone Numbers are used, but the block itself is not owned by a carrier, is called a Contaminated Range.

Due to the above, for an Intermediary it is no longer sufficient to match 6 digits of NPA/NXX portion of NANP. It is necessary to match 7 digits to find the carrier subscription accurately. In addition, for contaminated ranges it is necessary to match all 10 digits of NANP number plan in order to accurately find carrier subscription association. Since there are virtually hundreds of thousands of telephone numbers assigned to subscribers every day, it is necessary that the information is available to an Intermediary in real time to accurately route the messages from one network to another, or even within a network.

The Intermediary, in effect, is performing what is known in Telecom lingua as Inter-Exchange routing. Traditionally, all Inter-Exchange routing is done using a database called the Local Exchange Routing Guide (LERG). The LERG contains information about the current network configuration and scheduled changes within the local exchange providers' networks. The LERG is primarily designed to be used for routing of inter-LATA calls by inter-exchange carriers (IXC). The LERG guide informs telecom companies which end office or tandem office the NNX resides in and how calls should be routed and rated so that they can properly terminate to the appropriate telephone number. The LERG database is updated periodically by companies such as Telcordia in the United States and distributed, usually on a monthly basis. However, the mandate by the FCC that allows number pooling and portability may significantly damage the accuracy of LERG based routing due to the time lag involved. Therefore a real-time feed of number pooling and portability is needed in addition to LERG database update in order for an Intermediary to accurately deliver messages from one network to another.

Figure 13:
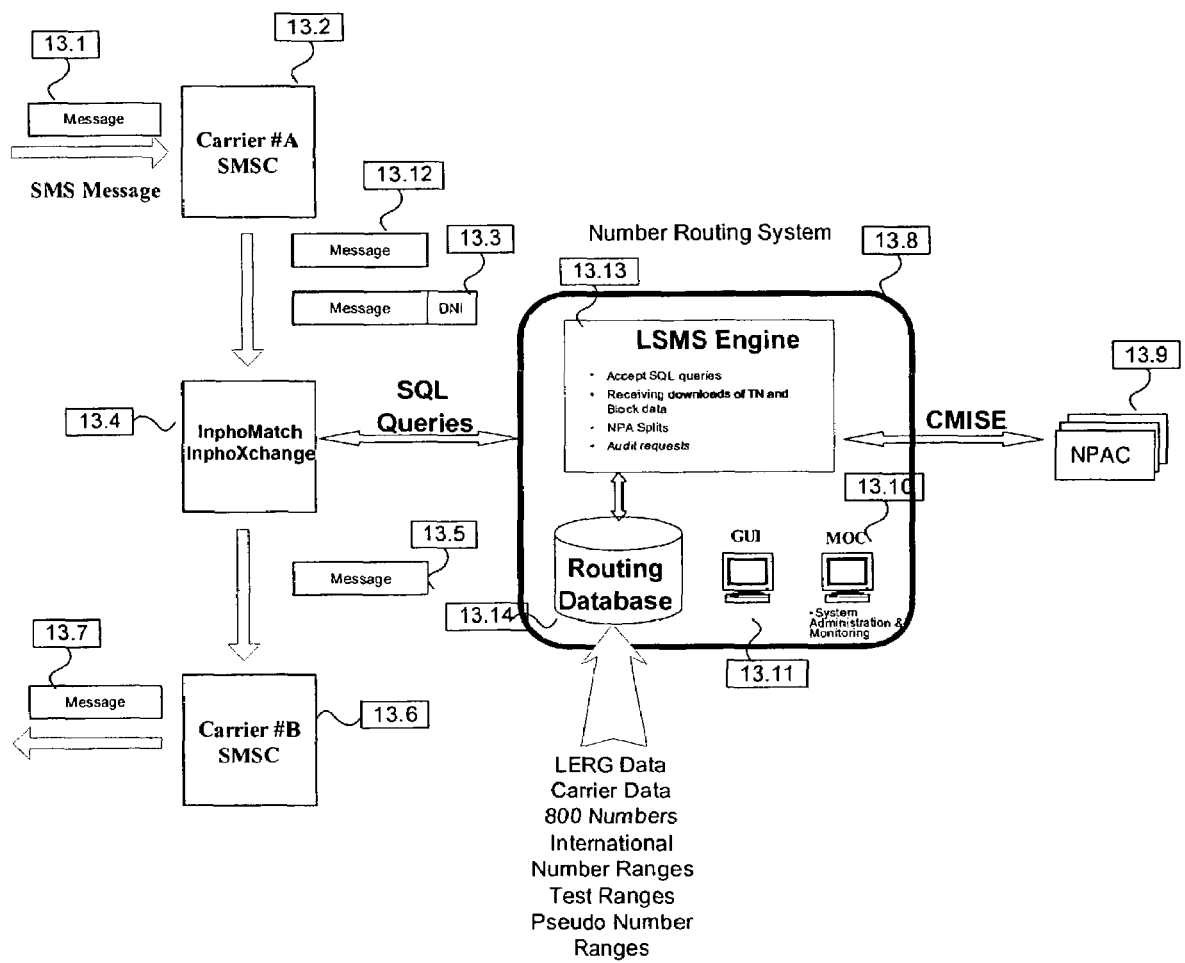
FIG. 13 shows the routing database system and the method of routing resolution for SMS messages, in accordance with the present invention.

The routing data system implemented in the preferred embodiment of this invention is shown in FIG. 13. The system is shown with reference to transmittal of a SMS message from one wireless network to another and how the routing database is used for obtaining route information.

The routing data implemented in a preferred embodiment of this invention is comprised of:

LERG Data

Updates from individual carriers for "in-network" numbers

Updates from carriers related to Mobile Virtual Network Operator (MVNO) ranges

Updates from other Intermediary networks and service providers

NPAC data

Portable ranges

Pooled ranges

Contaminated ranges

Ported numbers 800 numbers

Pager numbers

International data ranges

Test ranges

Some of the above information is obtained in real time (such as NPAC updates) and others are obtained periodically from various sources, including carriers themselves. The information thus obtained is combined and stored in the routing database shown in FIG. 13.

FIG. 13 further shows an example of SMS message exchange between two wireless networks, incorporating a number portability routing dip. Message 13.1 from a wireless network is received by the network's SMSC (13.2). Here there are two choices. The SMSC (13.2) may resolve the final destination network by using its own internal routing database that has similar capabilities as the Intermediary routing database, or the SMSC (13.2) may chose to simply forward the message (13.12) to the Intermediary for resolving the route, performing necessary transformations and forwarding to the next hop. In the first case, the SMSC (13.2) will have to append a destination network identifier, DNI (13.3) to the message in order to explicitly instruct the Intermediary as to what the final destination network for the message is. In the later case, the message (13.12) comes to the Intermediary without any resolution to the final destination network performed in which case full routing resolution is performed in the Intermediary including a Number Portability data dip. FIG. 13 also shows an LSMS database engine (13.13) that obtains real-time data feeds from NPAC records (13.9). The LSMS database engine (13.13) further consist of the Routing Database (13.14), a Graphical User Interface (13.11), and a Monitoring Operations Console (13.10). When a routing database dip needs to be performed, the switching module (13.4) which is a logical representation of various units involved in resolving the cost function illustrated in FIG. 3, SQL query is performed on the Routing Database (13.14) to extract the information.

The present invention allows the flexibility of applying or not applying full number pooling and portability database dip, according to the above description, which is needed in any practical implementation. One of the reasons why a network operator may chose to resolve a route may be to reduce the cost of performing a data dip in the Intermediary network.

Routing Loop Issue

Inaccuracy of the routing database may pose another problem in the form of routing loops. When an Intermediary network, for example, forwards a message to a carrier's network, assume there is a mismatch in the routing database between the Intermediary network and the destination carrier's network. It is conceivable that the destination carrier may re-route the message back to Intermediary thinking that the message belongs to another carrier connected to the intermediary. The Intermediary may in-turn send the message back due to its database entry.

The above scenario, in fact, occurs in real practice. While the above problem can occur even before the FCC mandate of number pooling and portability, the probability of mismatch increases as the contamination and portability of numbers increases between the carriers, simply due to the volume of changes.

Therefore real-time accurate data is necessary in the Intermediary's network in order to reduce the possibility of these routing loops.

Roaming Scenario and Delivery Optimization

Roaming is central to GSM networks and is also increasingly being allowed by way of interconnection agreements between (Interim Standard) IS-41 compatible networks for TDMA and CDMA technologies. When a mobile subscriber is roaming on a partner carrier network (visited network), the subscriber registration information is forwarded to the Home Location Register (HLR) in the home network. By querying the HLR, one can find the gateway address for terminating a call (message) in the visited network.

Typically, in a roaming scenario a message is delivered to the home network which would in-turn forward the message, depending upon the technology (SMS, MMS etc.) over SS7 or an IP based inter-connect network. For an SMS message, if the message is delivered to the home SMSC, the home SMSC queries the HLR and finds the roaming gateway switch. The SMSC would then deliver the message through visited network MSC network element. The disadvantage of this approach is that the home SMSC is involved unnecessarily when a message could be delivered directly to the visited network by querying the HLR for location information. In addition, the SMS message would also traverse the SS7 network from the home to the visited network segment before the message is delivered. For intercontinental SMS messaging this could be a significant cost issue as the SMS message has to traverse several SS7 network segments managed by several service providers.

Those who are familiar with the art will appreciate a well known fact that in many cases an IP network offers substantial cost savings over the SS7 network for delivering signaling and messaging data. To this effect, there are several efforts in the industry to offload SS7 using standards such as SIGTRAN. Voice over IP (VoIP) technology is built on this model which offers substantial savings in cost over an equivalent circuit based solution using SS7 signaling.

The Intermediary network, in accordance with the present invention, provides a mechanism to optimize the delivery of SMS messaging to a visited network without involving the home SMSC. The flexible routing information database with real-time ported number feed, and ability to query home location register (HLR) can be used to deliver an SMS message (or an MMS message) directly to appropriate visited network gateway.

Figure 8:
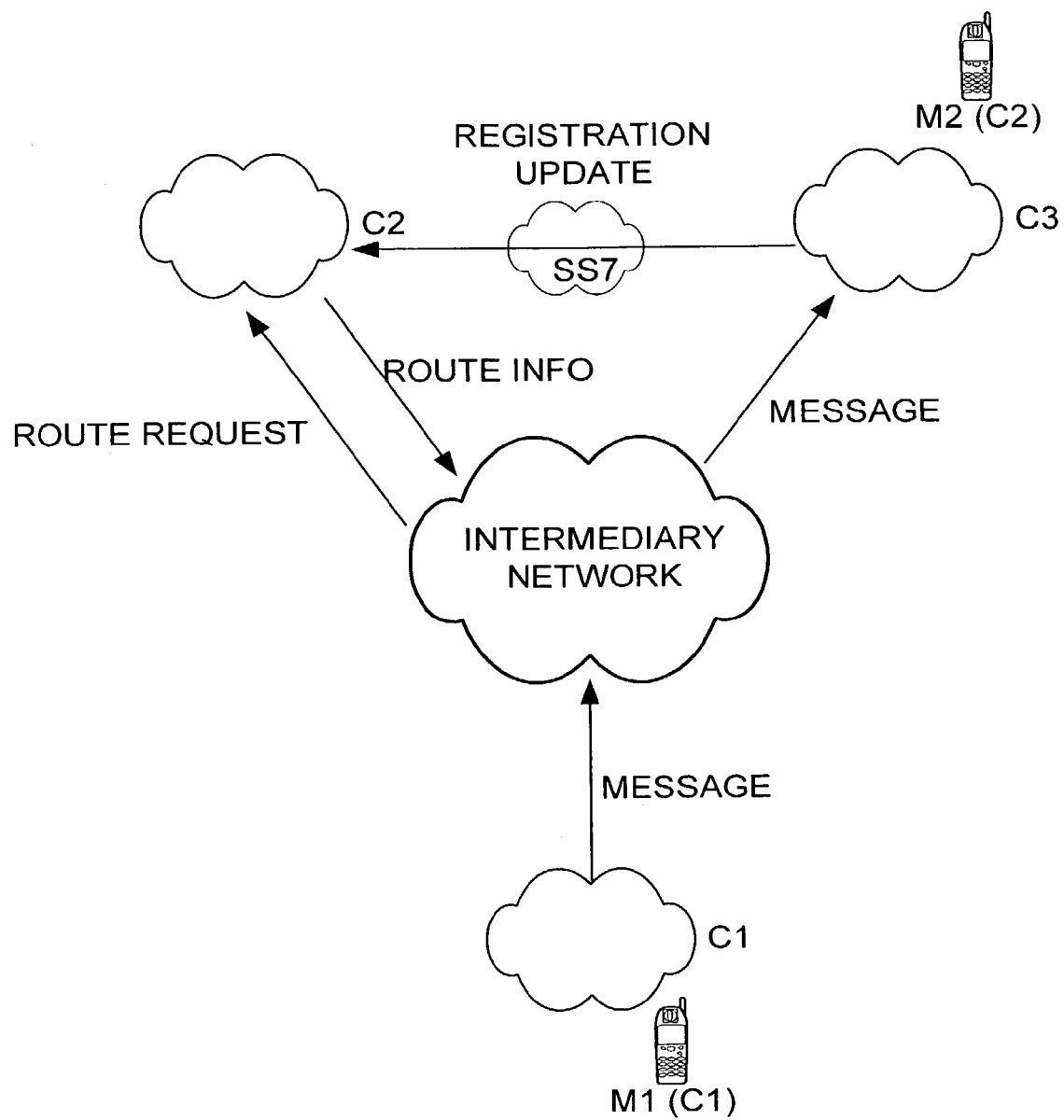
FIG. 8 illustrates delivery of a message to a visited network with roaming subscriber.

FIG. 8 illustrates the above improvement as an embodiment of this invention. FIG. 8 shows 3 carrier networks numbered C1, C2 and C3 as well as an Intermediary network. A mobile subscriber M1 with subscription association to Carrier C1 sends a message to another mobile subscriber M2 with subscription association to Carrier C2. Further, mobile subscriber M2 is roaming on Carrier C3 network as shown in FIG. 8. When the message is received by the Intermediary network, the Intermediary resolves routing information and finds the home carrier ID as per the logic outlined, for example, in FIG. 5. Further, depending upon the business rules configured, the Intermediary network may query home location register (HLR) of Carrier C2 to find the visited network (in this case carrier C3's network) Gateway switch address that is currently servicing the subscriber M2. Once this address is known, the Intermediary network can deliver the message directly to the visited network gateway (for example using SS7 or a combination of IP and SS7 networks depending upon the connection method) instead of delivering the message to the home network gateway such as an SMSC for an SMS message. Yet another related example is delivering a MMS message by an Intermediary directly to the visited network MMSC relay than home MMSC.

There are several advantages with the above technique. One, the home SMSC is not unnecessarily involved in receiving the message for a mobile subscriber not visiting its home network. Second, if the visited network is "far away" from home network, the cost of traversing SS7 (although it is acknowledged that not all the message types go through the SS7 network) may be significant. If the Intermediary has a local POP (Point of Presence) near the visited network gateway area, and if this POP is connected over an IP network, then substantial cost savings could be realized by delivering the message through the IP network for much of the distance before terminating on visited network gateway. Yet another advantage of this scenario is the speed with which the message can be delivered. By bypassing the home SMSC, for SMS messaging, for example, a store and forward element is bypassed.

Virtual Address Representation

A mobile subscriber may be assigned multiple addresses for various types of messaging to work. Some of these addresses are simply gateway addresses for other networks to access the mobile subscriber. Other addresses are in fact assigned to the telephone number itself. For example, in a GSM network, a single International Mobile Subscriber ID (IMSI) may be assigned with multiple Telephone Numbers, one for fax, another for data etc. Sometimes the multiple telephone number assignment is done for legacy POTS (Plain Old Telephone System) access.

Thus, in order to send a message to a mobile subscriber, one could use any of the available addresses and associated protocols as long as it is compatible for the type of message being sent. For example, a text message could conveniently be delivered using an email address without any loss of information. However, for a 2-way messaging service, where a message can be replied to using a reply address (without typing any "Send To" address) it is often necessary to represent the originating sender's mobile device with the same protocol/gateway address that is used for terminating the message. For example, if email is used to terminate a text message sent by an originating subscriber using a SMS message, then it is required to have a return email address associated to the originating mobile device, even though the original message itself was in a SMS format.

In the above example, it is possible to attach an SMTP addressable Internet domain name to a telephone number, and thereby preserve the originating Telephone Address in the new address structure. In certain other cases, it may be necessary to change the originating address in order for messaging to work in the destination network. For example, certain mobile terminals (e.g., Skytel's pagers) in the United States have an associated "800" telephone number. In the North American numbering plan, "800" numbers represent toll free numbers. While these numbers are often routable (using another underlying NANP number) in many North American networks, these numbers do not necessarily work (routable) in overseas networks. Under such circumstances, if a mobile subscriber with an "800" directory number sends a message to an overseas subscriber, and if the overseas subscriber is reachable over an SS7 network, then it may be necessary for the Intermediary network to represent the originating subscriber using a temporary or even a permanent routing number and maintain a table to translate the addresses for 2-way messaging.

The foregoing discussion leads to a novelty in accordance with the present invention where subscribers of telecom carrier networks served by the Intermediary network for bridging messages may be represented by multiple virtual addresses within the Intermediary network in order to facilitate certain types of messaging. These addresses are typically routable in their respective network domains worldwide and translation of these virtual addresses to physical (carrier assigned) addresses takes place within Intermediary network.

Figure 9:
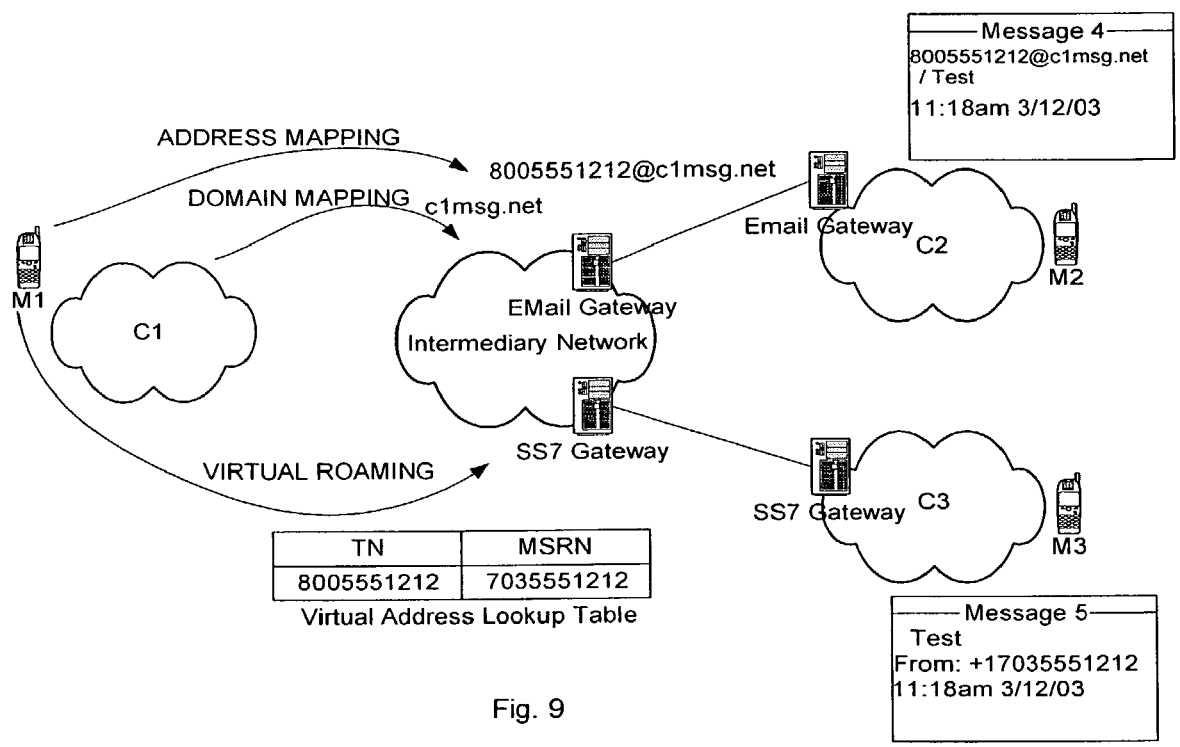
FIG. 9 illustrates mapping of virtual subscriber addresses from a carrier network into Intermediary network for facilitating message delivery, in accordance with the present invention.

An example shown in FIG. 9 clarifies the concept. In FIG. 9, mobile subscriber M1 belongs to carrier C1, mobile subscriber M2 belongs to carrier C2, and mobile subscriber M3 belongs to carrier C3. Further, mobile subscriber M2 is (among others) addressable by SMTP (email) protocol and mobile subscriber M3 is (among others) addressable by SS7 network. The Intermediary Network represented in FIG. 9 would then have virtual addresses for mobile subscriber M1 for both Email delivery as well as SS7 delivery. For Email delivery, the domain is hosted by the Intermediary with Domain Name Servers pointing the SMTP protocol address to the host servers. The originating phone number, in this case 8005551212 is represented as a virtual email address in Intermediary network as 8005551212@C1MSG.NET. When the addressed party M2 receives a message (Message 4 in FIG. 9) originated by M1, the reply address would show up as the virtual email address enabling M2 to reply to that address. When the email reply is received by the Intermediary, the Intermediary strips the virtual address and sends the message back to the originating subscriber M1 using native Telephone Number addressing.

Figure 11:
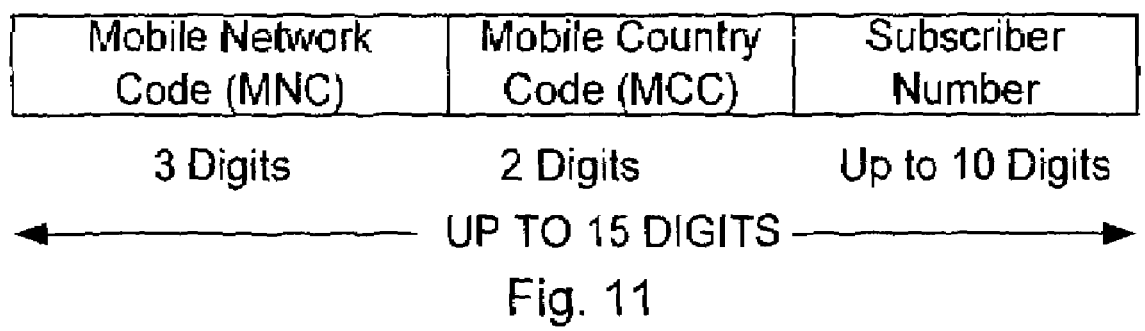
FIG. 11 shows a Mobile Subscriber Roaming Number (MSRN) number in E.164 Format.

Also represented in FIG. 9 is another virtual address in the form of Mobile Subscriber Roaming Number (MSRN). Since an Intermediary may need to interconnect certain networks or subscribers via a combination of IP and SS7 networks (this may be necessary as not all the carriers in the world may have IP protocol interface for message interchange), there needs to be a way to represent the subscriber in the IP domain to a routable address in the SS7 domain. This can be done in many ways. In one embodiment, a set of virtual (but routable) telephone numbers in e.164 format (explained in FIG. 11) is assigned to the IP-SS7 interfacing gateway which uses these numbers for assigning temporary routing numbers (MSRNs) to facilitate messaging from SS7 to IP domain. The Virtual Address Lookup Table shown in FIG. 9 is used to map the real telephone number in MSISDN format into a MSRN number. When the message is terminated to the MSRN number, the message is re-directed in the IP domain (or some other domain using appropriate protocol and addressing format) to the intended recipient. Referring again to FIG. 9, mobile subscriber M3 wishing to send message to M1 performs a Send Routing Information (SRI) query which is part of GSM MAP protocol. The query then returns a virtual MSRN number for routing the actual message. This MSRN number is then used by carrier C3 network to terminate the actual message into the Intermediary network. The MSRN number is referred to as virtual because the subscribers belonging to carrier networks C1 and C2 are represented virtually as "roaming" subscribers in Intermediary network, as messages destined to these subscribers are assigned with MSRN numbers just as in the traditional case of handling roaming subscribers in SS7 networks.

Thus, the above two examples, illustrated in FIG. 9 shows that the virtual addressing concept is one of many features implemented in an embodiment of this invention that permits seamless transfer of messages from one carrier network to another. The virtual addressing and associated address translation is typically supported by one or more Transformation units.

Multi-Hop Intermediary Networks for Bridging Source and Destination Wireless Networks Many times the final destination network may be reachable through one or more other Intermediary networks or service providers. Depending upon the capabilities of such "in-between" networks, the quality of service and other feature sets supported for bridging inter-network traffic might be effected. In certain extreme cases a forward routing of a message from one network to another might be different from the return path. An Intermediary network and system, thus, must account for the peculiarities of various interconnections and network capabilities to provide messaging services.

The flexible routing mechanism described by this Invention allows for the peculiarities of various interconnections by way of connection-specific transformation logic, comprehensive routing data as well as resolving cost function in real time to route the message in the face of congestion and failures.

Specifically, the routing logic shown in FIG. 5 allows for routing through an Intermediary network. The logic shown in module 5.7 of FIG. 5 can access a table where a next hop gateway route is encoded for reaching a particular carrier network. The next hop gateway may be part of another Intermediary or service provider network.

Figure 12:
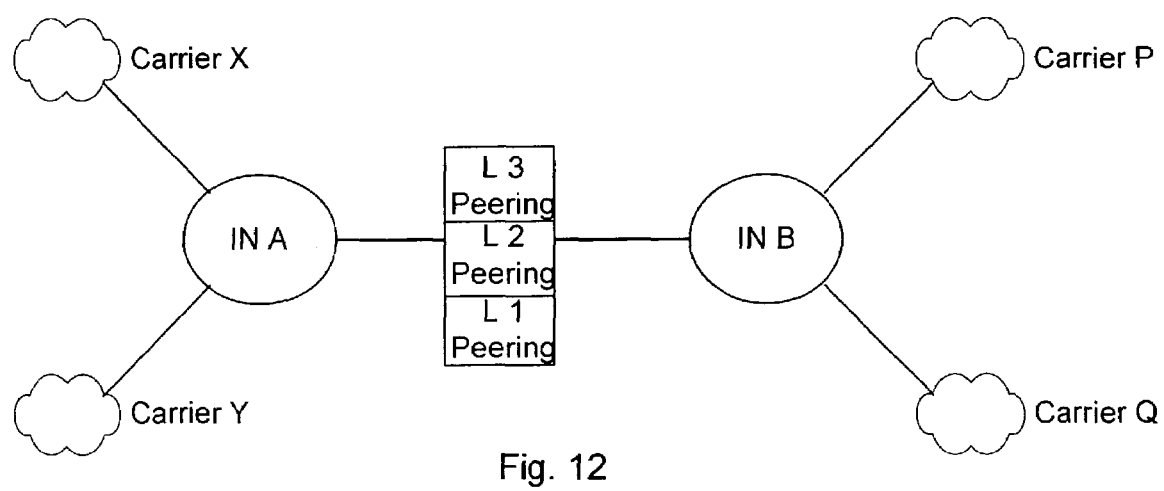
FIG. 12 shows an interconnection of two Intermediary Networks, in accordance with the present invention.

In case of Multi-hop Intermediary Networks, the Intermediary networks could connect in multiple different ways. FIG. 12 shows two Intermediary networks, IN A and IN B, connected to Carrier networks X, Y and P, Q respectively. FIG. 12 also shows 3 levels of interconnections. These interconnections are denoted by L1, L2 and L3 peering in FIG. 12 which are explained below.

Level 1) Originating Intermediary network (IN A) performs the final protocol conversion of the message to conform to its ultimate destination. In this case the second Intermediary to which the final destination network is connected performs only routing of the message with very little message and protocol transformation. In this case the message from Originating Intermediary network (IN A) "tunnels" through the second Intermediary network (IN B) to its final destination with minimal transformation (such as character conversion etc.).

Level 2) Originating Intermediary network (IN A) treats the second Intermediary network (IN B) just like any other carrier network and performs message protocol translation that conforms to the specification of the second Intermediary network (IN B). Upon receipt of a message from first Intermediary, the second Intermediary performs all the necessary transformations and routing functions to successfully deliver the message to its final destination.

Level 3) Originating Intermediary network (IN A) first detects if a message needs to go through another Intermediary network before reaching its final network destination. If such determination succeeds (after going through the necessary routing and cost function logics described in this Invention), the message is transmitted to the second Intermediary network (IN B). The second Intermediary network would then receive the message and performs all necessary transformations on the message before delivering to the final destination network.

In the level 1 interconnection scenario, the burden of final message transformation (as compatible to the final destination network) rests with the first Intermediary network when the message leaves its home network. In the level 3 interconnection scenario, the burden of final message transformation (as compatible to the final destination network) rests with the final Intermediary network before the message enters its destination network. Level 2 interconnection is somewhere in between.

In practical terms, this scenario is akin to having multiple agents acting on behalf of two clients performing a transaction and deciding on how the work is divided between the representing agents.

The unique feature of this invention is that the flexible way of arranging the routing and transformation units, all the above possible interconnection methods in case of multiple hop Intermediary network message transmission is easily supportable.

Selective Storage and Re-Transmittal

As a message is transmitted from one wireless network to another the message passes through the Intermediary network, according to the present Invention. Depending upon the mechanism of delivery into the destination network, the Intermediary network may need to support flexible storage mechanisms based on several factors.

For example, in case of Short Message Service (SMS), if the message is to be delivered to an SMSC of the destination network, then the availability of subscriber is not a factor and storage of SMS message for delivery to subscriber, in case subscriber's handset is out of service or coverage, lies with the destination SMSC. On the other hand, if the message is delivered directly through GMSC gateway of the destination carrier to the handset, since GMSC and subsequent units involved does not have long term message storage capability, the storage of the message and subsequent re-transmission rests with the Intermediary network.

In case of a Multi-media message (MMS), a similar scenario arises. If the MMS message is delivered through MMSC Relay gateway unit of the destination carrier, then the storage of the message while the subscriber is being contacted rests with the destination carrier's MMSC. On the other hand, if IP network (such as GPRS) or WAP proxy gateway is used to deliver the message, then the burden of storage may lie with the Intermediary system.

The present invention tackles the above scenario by incorporating flexible storage mechanism, wherein the routing entities involved intelligently stores and forwards the message depending upon the delivery method and capabilities of the destination network gateways. If the destination network has store and forward capability, then the message is not stored in Intermediary gateway. If the destination network does not have store and forward capability, then the Intermediary network may store the message till it is ascertained that the message is delivered to the intended recipient. This logic is programmed into the routing entities in the Intermediary Network as per the present Invention.

Just as in the case of many other factors, the flexibility of wiring the routing and transformation units according to the needs of source and destination carriers, and routing the message to a storage unit based on the need is an important aspect of this invention.

Message Detail Record Generation Process

Every telecom network element generates records of the traffic flowing through the system. The records are typically stored in flat files and transferred through a mediation system to a central repository. The reconciled records are called Call Detail Records (CDRs). CDRs are called Message Detail Records (MDRs) in the present description in view of the "message-centric" description of the present invention. The MDR generation process is detailed in FIG. 14.

Figure 14:
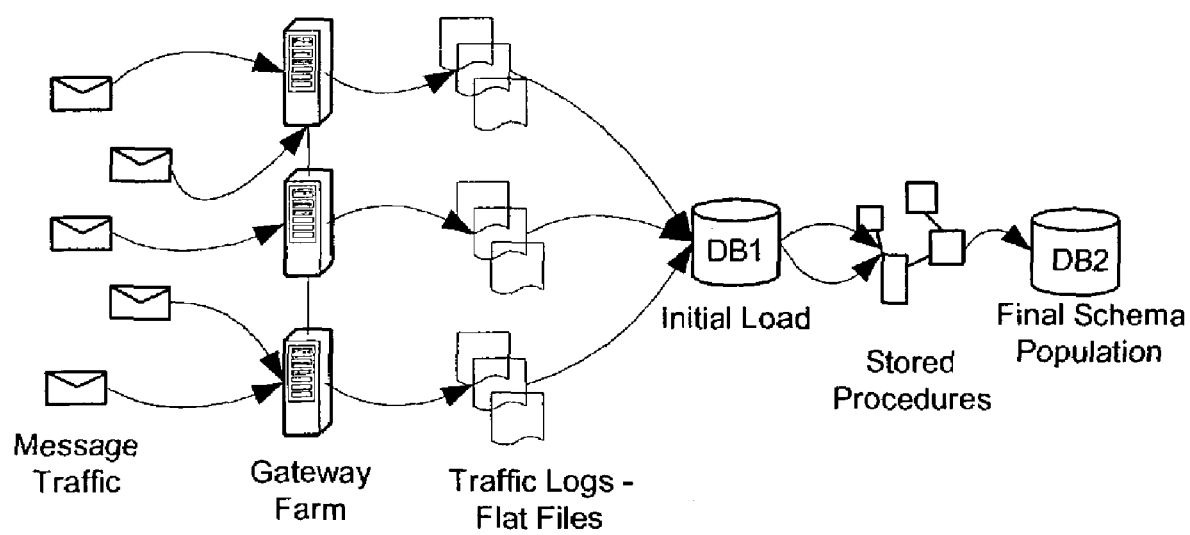
FIG. 14 illustrates a Message Detail Record generation process within an Intermediary network, in accordance with the present invention.

FIG. 14 shows messages (denoted by "Message Traffic") flowing through various gateway entities (denoted as "Gateway Farm") as they are routed through the Intermediary network system. Each of the gateway entities in the Gateway Farm and major software program entities (not shown in the FIG. 14) loaded in those gateways generate traffic logs as the messages get transformed and routed through the system. These traffic logs are typically in the form of SML file (FIG. 6) format, although many other "standard" formats (such as Apache web server log formats, Windows operating system event logs etc.) may also used in the preferred embodiment of this invention. These logs are stored in a database or a file system (DB1 in FIG. 6). A set of stored procedures are then executed in the data store for reconciliation of the records and integrity checks before populating the records into final data store (DB2 in FIG. 6).

The data then can be used for a number of purposes including display of statistics on a website, for example, for monitoring purpose; transfer of records to inter-connect networks for their internal reconciliation into billing and other systems; transfer into another data warehouse system for performing analysis on the data etc.

Due to the flexible routing mechanism provided by the present Invention, the route a message takes, and the transformations it undergoes varies greatly based on the interconnect networks involved, based on the real time routing data feeds, based on subscriber roaming and based on real time traffic conditions in case of multiplicity of conditions. Therefore state representation of message route and associated quality of service metrics, billing data vary from time to time. For example, if a message is delivered directly to a roaming network, then the message may be billed at a different rate than if it is delivered to the subscriber's home network.

Although the process of capturing the MDRs from network elements depicted above is fairly standard in the industry, the SML file format (FIG. 6) that captures various intricacies of the way the message traveled in the form of meta data tags. An example instantiation of SML formatted log message is shown in FIG. 7.

In FIG. 7, item 7.1 represents format of the message, in this case the SML. In FIG. 7, item 7.2 represents destination telephone number, item 7.3 represents the source telephone number. The next item 7.4 represents message identifier, which is unique across the system. Item 7.5 represents status code of the message indicating whether it is a incoming message in to the system, outgoing message etc. Further, item 7.6 represents the agent that recorded the log entry. Item 7.7 represents Message Signaling Unit (MSU) count in the case of SS7 transmission of the message, 7.8 represents the delivery protocol used, 7.9 denotes the delivery method used. The delivery method, for example specifies whether the message is delivered directly to the final destination or whether it went through another Intermediary. Item 7.10 represents the out agent that handled the message at the output boundary of the system. And finally, 7.11 represents error code, if any, encountered by the message during its transmission through the module that generated the log record.

The data records mentioned in the above example are a representative list of items in SML formatted message in the preferred embodiment. The SML format permits addition of any arbitrary mark up tags (also called meta-tags), as new routing and transformation modules are added into the mix. The mark up tags are then used by post processing tools for analysis purpose.

Items 7.6 thru 7.11 are called mark up tags as indicated in FIG. 6 SML message format. These mark up tags are added to the SML message format as new requirements, gateways and protocols are supported in the system. The purpose of the mark up tags is to convey additional information to recording and analysis entities (in case of SML log message handling) as the messages flow through various parts of the systems.

As can be seen, the flexible combination of routing and transformation modules is made possible by mechanism such as SML formatted logging entities, which offers flexibility of recording specialized data using meta-tags.

Descriptive List of Transformation and Routing Entitites

The present invention (FIG. 1) specifies a flexible Intermediary network system comprising a set of transformation and routing units, combining either through a pre-wired logic or through a computed logic, in order to accept, process and forward a message from one (wireless) network to another (wireless) network. Further, the present invention (FIG. 1) lists a set of Input and Output units acting as Interface units.

The following tables 1, 2 and 3 provides the descriptive list of these units that are generated in a particular embodiment of this invention. Further, the invention or its embodiments doesn't preclude generation of logical entities that combines one or more of transformation and routing units specified in these tables. It may be noted that the list presented is only a representative sample of various transformation and routing units that may be developed as part of a particular embodiment.

TABLE 1

Representative list of Protocol Transformation Units

| Protocol Transformations | Description |
|---|---|
| ANSI 41 MAP → SMT | TIA/EIA 41 MAP to SMT Protocol Converter |
| CIMD → SMT | CIMD protocol to SMT protocol converter |
| GSM MAP → SMT | GSM MAP to SMT Protocol Converter |
| HTTP → SMT | SMPP to SMT Protocol Converter |
| SMPP → SMT | SMPP to SMT Protocol Converter |
| SMT → ANSI 41 MAP | SMT to TIA/EIA 41 MAP protocol converter |
| SMT → CIMD | SMT to CIMD protocol converter |
| SMT → EMI/UCP | SMPP to SMT Protocol Converter |
| SMT → GSM MAP | SMPP to SMT Protocol Converter |
| SMT → HTTP | SMPP to SMT Protocol Converter |
| SMT → SMPP | SMPP to SMT Protocol Converter |
| SMT → SMTP | SMPP to SMT Protocol Converter |
| SMT → SNPP | SMPP to SMT Protocol Converter |
| SMT → WAP | SMT to WAP protocol converter |
| SMT → WCTP | SMPP to SMT Protocol Converter |
| SMTP → SMT | SMTP to SMT Protocol Converter |
| SNPP → SMT | SMPP to SMT Protocol Converter |
| UCP → SMT | UCP to SMT Protocol Converter |
| WAP → SMT | WAP to SMT protocol converter |
| WCTP → SMT | WCTP to SMT Protocol Converter |

TABLE 2

Representative list of Message Transformation Logic Units

| Message Transformations | Description |
|---|---|
| Address Transformation | Changes the original or destination address depending upon specified rules. |
| Content Blocking Filter | Filter to block content based on its characteristics. Binary message filter, is one such example. |
| Black and White List Filter | Specifies the logic block that allows or blocks messages to or from certain mobile subscriber addresses. |
| Message Generator | Generates a new message in response to a originated message. The new message could be a error message, confirmation or a copy depending upon the requirements of interconnecting carrier networks. |
| Character Map Transformer | Maps characters from one form of encoding to another depending upon destination network and protocol to be used. |
| Segmentation and Re-assembly Unit | Ability to segment and reassemble messages based on source or destination protocol and network characteristics |
| Message Translator | Translates message content from one language to another. |

TABLE 3

Representative list of Routing Logic Units

| Routing Units | Description |
|---|---|
| Regular Expression Router | Routes a message based on applying a regular expression transformation to a message. |
| Authentication Unit | Authenticates input or output mobile subscriber address. |
| General Purpose Router | Routes based on specified rules from one unit (such as a transformation unit) to another. |
| Message Queue Router | Routes message to a specific message queue within the message exchange network. |
| Load Balancing Router | Routes message to a destination network while applying load balancing rules such as round-robin or random selection methods. |

TABLE 3-continued

Representative list of Routing Logic Units

| Routing Units | Description |
| --- | --- |
| Timed Unit Message Forwarding Router | Forwards a message after a time out. Retransmissions after a failed delivery is one example usage of this type of routing unit. |
| NPA/NXX Lookup Router | Routes based on first 6 digits of a phone number |
| LSMS/NPAC Lookup Router | Routes based on contaminated/ported phone number ranges. |
| SS7 GTT Routing Unit | Routes based on Global Title Translation database in SS7 networks. |
| DNS Resolver | Resolves domain name and address for certain protocol methods for routing a message. |

LIST OF ACRONYMS

| | |
| --- | --- |
| ANSI | American National Standards Institute |
| BSC | Base Station Controller |
| BSS | Base Station Sub-system |
| BTS | Base Transceiver Station |
| C7 | Common Channel Signaling System 7 |
| CDMA | Code Division Multiple Access |
| CIMD | A data exchange protocol to connect to the Nokia Network Elements such as a short message service center (SMSC) |
| EMI/UCP | External Machine Interface/Universal Connectivity Protocol |
| EMS | Enhanced Messaging Service |
| GMSC | Gateway Mobile Switching Center |
| GSM | Global System for Mobile Communications |
| HLR | Home Location Register |
| HTTP | Hyper Text Transmission Protocol |
| iDEN | A variant of TDMA protocol developed by Motorola Inc. |
| MDN (Intermediary) | Mediary Network. A network and system bridging two or more wireless networks for facilitating message exchange |
| IP | Internet Protocol |
| IWMSC | Inter-working Mobile Switching Center |
| LERG | Local Exchange Routing Guide |
| LSMS | Local Service Management System |
| MAP | Message Application Part |
| MMS | Multi-media Messaging Service |
| MMSC | Multi-media Message Service Center |
| MO | Mobile Originated Message |
| MSC | Mobile Switching Center |
| MSU | Message Signaling Unit |
| MT | Mobile Terminated Message |
| MVNO | Mobile Virtual Network Operator |
| NANP | North American Numbering Plan |
| NPAC | Number Portability Administration Council |
| PLMN | Public Land Mobile Network |
| POP | Point of Presence |
| SML | System formatted Message Log (Internal Log message Format) |
| SMPP | Short Message Peer to Peer Protocol |
| SMS | Short Message Service |
| SMSC | Short Message Service Center |
| SMT | System formatted Message Template (Internal Message Format) |
| SMTP | Simple Mail Transfer Protocol |
| SS7 | Signaling System 7 |
| TDMA | Time Division Multiple Access |
| VLR | Visitor Location Register |
| WAP | Wireless Access Protocol |
| WNP | Wireless Number Portability |
| SME | Short Message Entity |
| ESP | External Service Provider |

What is claimed is:

1. An intermediary network system for interconnecting multiple networks, comprising:

first and second intermediary networks each comprising an input unit selectably connectable to an entity from which a message is received, the input unit including at least one transformation unit that transforms the message from a Short Message Peer to Peer format to an internal format usable by the intermediary network;

at least one output unit selectably connectable to an entity via which the message can reach a destination address, the at least one output unit including at least one transformation unit that transforms the message from the internal format usable by the intermediary network to a Short Message Peer to Peer format;

said input unit and said at least one output unit also being operable to perform character mapping; and, a first routing unit that checks the validity of a destination number and, when necessary, adds digits to the destination number;

a second routing unit, employed when an error occurs in the first routing unit, that generates an error message intended for a source telephone number to inform a subscriber that a message failed due to a numbering error, the second routing unit operable to route the error message to the at least one output unit;

a third routing unit, employed when the second routing unit is not employed, that resolves a delivery method for the message based, at least in part, on solving a cost function;

a filter unit that, in accordance with a decision made by the entity via which the message can reach the destination address, selectably blocks binary messages from being passed to the entity via which the message can reach the destination address, wherein the first intermediary network is in communication with at least a first carrier;

wherein the second intermediary network is in communication with at least a second carrier and the first intermediary network, wherein messages are exchanged between the first and second carriers via the first and second intermediary networks, wherein the first and second intermediary networks have a predetermined peering relationship with each other such that it is known before a message is passed from the first intermediary network to the second intermediary network which transformation and routing actions, if any, are to be performed by the first and second intermediary networks, and wherein an interconnection between the first and second intermediary networks is via a distributed queuing system.

2. The system of claim 1, wherein the first intermediary network performs all transformation and routing actions.

3. The system of claim 1, wherein the second intermediary network performs all transformation and routing actions.

4. The system of claim 1, wherein each of the first and second intermediary networks are in communication with a plurality of carriers.

5. The system of claim 4, wherein the predetermined peering relationship is based on carriers between which the messages are being exchanged.

6. The system of claim 1, wherein the entity is at least one of a gateway and another network.

7. The system of claim 6, wherein the gateway comprises at least one of a SMSC gateway, an MMSC gateway, an email gateway, an IWMSC gateway and a GMSC gateway.

8. The system of claim 1, wherein the routing unit determines the next hop address for the message based on a content of the message.

9. The system of claim 1, wherein the routing unit determines the next hop address for the message based on an interface through which the message was received.

10. The system of claim 1, wherein the routing unit determines the next hop address for the message based on predetermined business rules associated with a message originating network and a message destination network.

11. The system of claim 1, wherein the routing unit determines the next hop address for the message based on a dynamic analysis of available interconnection links.

12. The system of claim 1, wherein the routing unit determines the next hop address for the message based on network subscription and access information of the message destination network.

13. The system of claim 1, wherein the routing unit determines the next hop address for the message based, at least in part, on determining whether a destination telephone number is at least one of (i) part of a contaminated range and (ii) ported.

14. The system of claim 13, wherein a third party provider provides information to the intermediary network system regarding contaminated ranges and ported numbers.

15. The system of claim 14, wherein the third party provider operates an NPAC database.

16. The system of claim 1, wherein the routing unit determines the next hop address for the message based, at least in part, on whether an intended recipient of the message is roaming.

17. The system of claim 1, wherein the transformation unit is connected to an external service provider to provide outsourced message transformations services.

18. The system of claim 1, further comprising a message detail record (MDR) database.

19. The system of claim 18, wherein an MDR is used to reconcile message exchange volumes between networks connected to the intermediary network system.

* * * * *